United States Patent
Shinohara et al.

(10) Patent No.: US 7,236,288 B2
(45) Date of Patent: Jun. 26, 2007

(54) FUNCTIONAL DEVICE, ELECTROCHROMIC DEVICE, OPTICAL DEVICE, AND IMAGE-TAKING UNIT

(75) Inventors: Ryuji Shinohara, Kanagawa (JP); Yoshio Ishii, Kanagawa (JP); Takuya Inoue, Kanagawa (JP); Takanori Hioki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/365,610

(22) Filed: Mar. 2, 2006

(65) Prior Publication Data
US 2006/0198010 A1   Sep. 7, 2006

(30) Foreign Application Priority Data
Mar. 3, 2005   (JP)   ............................ P.2005-058993

(51) Int. Cl.
*G02F 1/15*   (2006.01)
*H01L 33/00*   (2006.01)
*H01L 31/00*   (2006.01)
*G11C 11/00*   (2006.01)
*C01B 31/00*   (2006.01)

(52) U.S. Cl. ........................ 359/265; 257/103; 136/263; 365/151; 204/157.47; 428/1.31

(58) Field of Classification Search ................ 359/265, 359/270, 275, 296, 248; 257/10, 79, 103, 257/E51.03, E51.042; 204/157.47, 157.49; 136/244, 246, 263; 365/151; 428/1.31; 430/584, 611, 614, 620, 627; 429/111
See application file for complete search history.

(56) References Cited

U.S. PATENT DOCUMENTS

| | | | | |
|---|---|---|---|---|
| 4,623,437 A | * | 11/1986 | Visca et al. | ............ 204/157.47 |
| 5,712,461 A | * | 1/1998 | Zhang et al. | ........... 204/157.15 |
| 6,433,270 B1 | * | 8/2002 | Rack | ........................... 136/263 |
| 6,917,058 B2 | * | 7/2005 | Niigaki et al. | .............. 257/103 |
| 7,022,910 B2 | * | 4/2006 | Gaudiana et al. | ............ 136/256 |
| 2004/0067324 A1 | * | 4/2004 | Lazarev et al. | ............. 428/1.31 |
| 2005/0150544 A1 | * | 7/2005 | Fukui et al. | ................. 136/263 |

FOREIGN PATENT DOCUMENTS

| | | |
|---|---|---|
| JP | 2004-47229 A | 2/2004 |
| JP | 2004-171821 A | 6/2004 |
| JP | 2004-273272 A | 9/2004 |

OTHER PUBLICATIONS (Article)—S. Roy Morrison, "Electrochemistry at Semiconductor and Oxidized Metal Electrodes", Plenum Press, pp. 182-183.

* cited by examiner

*Primary Examiner*—Ben Loha
(74) *Attorney, Agent, or Firm*—Sughrue Mion, PLLC

(57) ABSTRACT

A functional device comprising a semiconductor material, wherein the functional device contains a compound not substantially undergoing oxidation-reduction reaction but having at least one lone electron pair and in which adding the compound negatively changes a flat band potential of the semiconductor material with respect to a case not adding it.

13 Claims, 4 Drawing Sheets

FUNCTIONAL DEVICE, ELECTROCHROMIC DEVICE, OPTICAL DEVICE, AND IMAGE-TAKING UNIT

BACKGROUND OF THE INVENTION

1. Field of the Invention

The present invention relates to a functional device such as batteries, capacitors, sensors, photoelectric conversion devices, photoelectrochemical cells, recording devices, electrochromic devices. Precisely, the invention relates to a functional device in which the flat band potential ($V_{fb}$) of the semiconductor is controlled as containing a specific compound.

In particular, regarding the electrochromic device for it, the invention relates to an optical device that comprises an electromotive force-generating element capable of generating an electromotive force in accordance with the intensity of electromagnetic waves, and an electrochromic device, and relates to an image-taking unit that comprises the optical device.

2. Description of the Related Art

In a functional device such as batteries, capacitors, sensors, photoelectric conversion devices, photoelectrochemical cells, recording devices, electrochromic devices, the reaction with the functional material that may occur in the semiconductor surface may often have some significant influences on the quality of the devices. Typical examples of a color-sensitized photoelectric conversion device are in U.S. Pat. No. 4,927,721 and JP-A 1-220380; and typical examples of an electrochromic device are in U.S. Pat. Nos. 6,067,184, 6,426,827, 6,605,239, 673,405, and JP-T 2003-511837. For the reaction on a semiconductor surface, the flat band potential of the semiconductor material is important. This is because, when a semiconductor material and a functional material undergo electron transfer on a semiconductor surface, then the electron shall pass through the valence band end (that is, the flat band potential) of the semiconductor material.

It is known that the flat band potential of a semiconductor material is intrinsic to the semiconductor material and it may change depending on pH (for example, Hiroshi Tubomura, Photoelectrochemistry and Energy Conversion, published by Tokyo Kagaku Dojin, and S. Roy Morrison, Electrochemistry at Semiconductor and Oxidized Metal Electrodes, published by Plenum Press). However, the method of flat band potential control is not always satisfactory.

The flat band potential may be controlled by selecting a semiconductor material, but even though the flat band potential of the selected material is on a suitable level and the improvement in the quality of functional devices could be expected from it, the semiconductor material would be of no use if it is expensive or is a dangerous substance. On the contrary, even though a semiconductor material could be produced relatively inexpensively and is safe and stable, its expression effect in functional devices may be small if its flat band potential is not on a suitable level. A method is desired capable of controlling the flat band potential of a semiconductor material independently of the semiconductor material itself.

The potential control may be possible by pH control. However, an organic solvent is often used in functional devices because of the functional limitation thereon, and a control method except pH is desired.

In a color-sensitized photoelectric conversion device, when a pyridine compound-containing electrolyte is used as in JP-A 2004-47229, JP-A 2004-171821 and JP-A 2004-273272, then it is reported that the inverse current is prevented and the open-circuit voltage rises. However, the prevention of inverse current is not always satisfactory, and a better method of inverse current prevention is desired. As will be obvious from the examples of a color-sensitized photoelectric conversion device, desired in the art are an all-purpose semiconductor flat band potential control method and a semiconductor flat band potential-controlled device of general applicability to all functional materials including semiconductor materials.

SUMMARY OF THE INVENTION

An object of the invention is to provide a method of controlling the flat band potential of a semiconductor material not by changing the semiconductor material but by using the same semiconductor material, and to provide a flat band potential control system that can be used even with an organic solvent. Another object of the invention is to provide a functional device, especially an electrochromic device fabricated according to the control method, to provide an optical device comprising the electrochromic device, and to provide an image-taking unit comprising the optical device.

As a result of assiduous studies made in consideration of the above-mentioned objects, we, the present inventors have found that, when a specific compound is used in a functional device, then it significantly changes the flat band potential of the device, and have reached the present invention. Preferably, the above-mentioned objects are attained by the following:

(1) A functional device comprising a semiconductor material, wherein the functional device contains a compound not substantially undergoing oxidation-reduction reaction but having at least one lone electron pair and in which adding the compound negatively changes a flat band potential of the semiconductor material with respect to a case not adding it.

(2) The functional device of (1), wherein the compound is a heterocyclic compound.

(3) The functional device of any one of (1) or (2), wherein an atom having the lone electron pair is an N atom or an O atom.

(4) The functional device of any one of (1) to (3), wherein the compound having the lone electron pair is an N or O atom-containing, 5- or 6-membered ring compound.

(5) The functional device of any one of (1) to (4), wherein a charge on an atom having the lone electron pair is −0.40 or less.

(6) The functional device of any one of (1) to (5), wherein an energy level of an atom having the lone electron pair is −11 eV or more.

(7) The functional device of any one of (1) to (6), wherein a charge on an atom having the lone electron pair is −0.50 or less, and an energy level of the atom having the lone electron pair is −9.5 eV or more.

(8) An electrochromic device which is the functional device of any one of (1) to (7), comprising: a cathode; an anode; and a charge-transporting material sandwiched between the cathode and the anode, wherein the charge-transporting material contains the compound.

(9) The electrochromic device of (8), having an optical density of 0.2 or less at a wavelength of 400 nm in a decolored state.

(10) The electrochromic device of any one of (8) or (9), wherein a mean value of an optical density at a wavelength of from 400 to 500 nm, a mean value of an optical density at a wavelength of from 500 to 600 nm, and an mean value of an optical density at a wavelength of from 600 to 700 nm in a decolored state are all 0.1 or less.

(11) An optical device comprising: an electromotive force-generating element capable of generating an electromotive force in response to electromagnetic waves; and the electrochromic device of any one of (8) to (10) capable of being driven by the electromotive force.

(12) An image-taking unit comprising the optical device of (11).

(13) The image-taking unit of (12), which is a lens-combined film.

Figure 1:
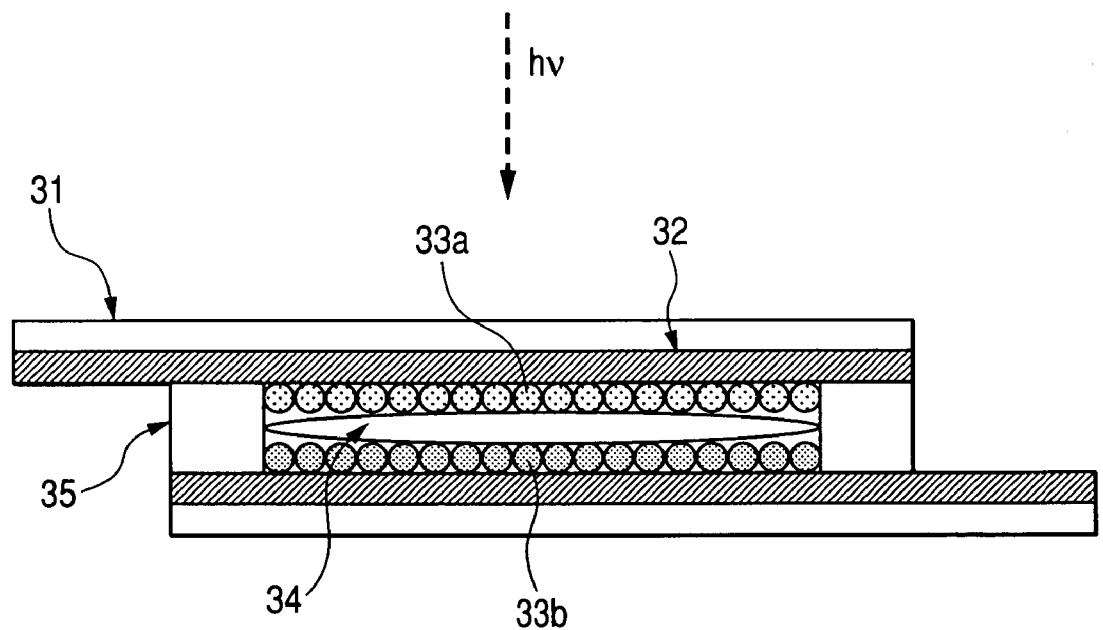
FIG. 1 is a schematic cross-sectional view showing one typical constitutional example of an electrochromic device of the invention.

1 denotes a lens-combined film unit; 4 denotes an image-taking lens; 5 denotes a finder; 6 denotes a strobe light-emitting part; 8 denotes a shutter switch; 13 denotes a phototransistor; 16 denotes a photographic film; 18 denotes a light cut-off sleeve; 20 denotes a lens holder; 21 denotes an aperture; 22 denotes an exposure opening; 23 denotes a dimmer filter; 24 denotes a stop; 29 denotes an optical axis; 31 denotes a support; 32 denotes an electroconductive coating; 33a, b denote electrochromic material-adsorbed porous materials; 34 denotes an electrolyte; and 35 denotes a spacer.

DETAILED DESCRIPTION OF THE INVENTION

The invention is described in detail hereinunder.

In the invention, "semiconductor material" is by general definition. For example, according to Dictionary of Physics (by Baifu-kan), "semiconductor" means a substance having an intermediate electric resistance between metal and insulator.

In the invention, "functional device" comprising a semiconductor material is a device capable of expressing some useful function. The functional device includes, for example, batteries, capacitors, sensors, photoelectric conversion devices (including color-sensitized types), photoelectrochemical cells, recording devices, electrochromic devices.

In the invention, the "functional device" comprising a semiconductor material "contains a compound", which means that the compound is in the constitutive element of the functional device. Preferably, the constitutive element can be in contact with the semiconductor material. For example, in one embodiment, the compound is in a charge-transporting material in an electrochromic device.

In the invention, in the "compound not substantially undergoing oxidation-reduction reaction but having at least one lone electron pair", the wording "not substantially undergoing oxidation-reduction reaction" means that the "compound having at least one lone electron pair" does not undergo oxidation-reduction reaction in a service range of the device.

For example, when the compound is in a color-sensitized photoelectric conversion device, it indicates a material not undergoing oxidation-reduction reaction within a range of no voltage application, since no voltage is applied to the device. In this case, the dye (e.g., ruthenium complex) held on the semiconductor surface is not within the scope of the "compound not substantially undergoing oxidation-reduction reaction but having at least one lone electron pair" for use in the invention. This is because the "dye held on the semiconductor surface" is excited by incident light and the thus-excited dye transfers an electron to the semiconductor layer (the dye is oxidized).

When the compound is used in an electrochromic device, it indicates a material not undergoing oxidation/reduction within a range of voltage applied to the electrochromic device in practical use. Since an electrochromic compound undergoes oxidation/reduction, it is not within the scope of the "compound not substantially undergoing oxidation-reduction reaction but having at least one lone electron pair".

In the invention, when a specific part is referred to as a "group", then the part may not be substituted by itself or may be substituted with one or more (up to a possibly largest number of) substituents. For example, "alkyl group" means a substituted or unsubstituted alkyl group. The substituent usable in the compound in the invention may be any and every substituent irrespective of the presence or absence of further substitution.

When the substituent of the type is represented by W, then the substituent for W may be any and every one with no specific limitation thereon. For example, it includes a halogen atom, an alkyl group (including a cycloalkyl group, a bicycloalkyl group, a tricycloalkyl group), an alkenyl group (including a cycloalkenyl group, a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group (including an alkylamino group, an arylamino group, a heterocyclic amino group), an ammonio group, an acylamino group, an aminocarbonylamino group, an alkoxycarbonylamino group, an aryloxycarbonylamino group, a sulfamoylamino group, an alkyl and arylsulfonylamino group, a mercapto group, an alkylthio group, an arylthio group, a heterocyclic-thio group, a sulfamoyl group, a sulfo group, an alkyl and arylsulfinyl group, an alkyl and arylsulfonyl group, an acyl group, an aryloxycarbonyl group, an alkoxycarbonyl group, a carbamoyl group, an aryl and heterocyclic-azo group, an imido group, a phosphino group, a phosphinyl group, a phosphinyloxy group, a phosphinylamino group, a phosphono group, a silyl group, a hydrazino group, an ureido group, a boronic acid group (—B(OH)$_2$), a phosphato group (—OPO(OH)$_2$), a sulfato group (—OSO$_3$H), and other known substituents.

More precisely, W includes a halogen atom (e.g., fluorine atom, chlorine atom, bromine atom, iodine atom), an alkyl group (this indicates a linear, branched or cyclic, substituted or unsubstituted alkyl group, and includes an alkyl group (preferably an alkyl group having from 1 to 30 carbon atoms, e.g., methyl, ethyl, n-propyl, isopropyl, t-butyl, n-octyl, eicosyl, 2-chloroethyl, 2-cyanoethyl, 2-ethylhexyl), a cycloalkyl group (preferably a substituted or unsubstituted cycloalkyl group having from 3 to 30 carbon atoms, e.g., cyclohexyl, cyclopentyl, 4-n-dodecylcyclohexyl), a bicycloalkyl group (preferably a substituted or unsubstituted bicycloalkyl group having from 5 to 30 carbon atoms, or that is, a monovalent group derived from a bicycloalkane having from 5 to 30 carbon atoms by removing one hydrogen atom from it, e.g., bicyclo[1,2,2]heptan-2-yl, bicyclo[2,2,2]octan-3-yl), and further includes a polycyclic structure such as a tricyclo structure; the alkyl group in the substituents described hereinunder (e.g., the alkyl group moiety of an alkylthio group) is an alkyl group having the concept as above, and it should further include an alkenyl group and an alkynyl group), an alkenyl group [this indicates a linear, branched or cyclic, substituted or unsubstituted alkenyl group, and includes an alkyl group (preferably a substituted or unsubstituted alkenyl group having from 2 to 30 carbon atoms, e.g., vinyl, allyl, prenyl, geranyl, oleyl), a cycloalkenyl group (preferably a substituted or unsubstituted cycloalkenyl group having from 3 to 30 carbon atoms, or that is, a monovalent group derived from a cycloalkene having from 3 to 30 carbon atoms by removing one hydrogen atom from it, e.g., 2-cyclopenten-1-yl, 2-cyclohexen-1-yl), a bicycloalkenyl group (a substituted or unsubstituted bicycloalkenyl group, preferably a substituted or unsubstituted bicycloalkenyl group having from 5 to 30 carbon atoms, or that is, a monovalent group derived from a bicycloalkene having one double bond by removing one hydrogen atom from it, e.g., bicyclo[2,2,1]hept-2-en-1-yl, bicyclo[2,2,2]oct-2-en-4-yl)], an alkynyl group (preferably a substituted or unsubstituted alkynyl group having from 2 to 30 carbon atoms, e.g., ethynyl, propargyl, trimethylsilylethynyl), an aryl group (preferably a substituted or unsubstituted aryl group having from 6 to 30 carbon atoms, e.g., phenyl, p-tolyl, naphthyl, m-chlorophenyl, o-hexadecanoylaminophenyl), a heterocyclic group (preferably a monovalent group derived from a 5- or 6-membered, substituted or unsubstituted, aromatic or non-aromatic heterocyclic compound by removing one hydrogen atom from it; more preferably a 5- or 6-membered aromatic heterocyclic group having from 3 to 30 carbon atoms, e.g., 2-furyl, 2-thienyl, 2-pyrimidinyl, 2-benzothiazolyl; the group may also be a cationic heterocyclic group such as 1-methyl-2-pyridinio, 1-methyl-2-quinolinio), a cyano group, a hydroxyl group, a nitro group, a carboxyl group, an alkoxy group (preferably a substituted or unsubstituted alkoxy group having from 1 to 30 carbon atoms, e.g., methoxy, ethoxy, isopropoxy, t-butoxy, n-octyloxy, 2-methoxyethoxy), an aryloxy group (preferably a substituted or unsubstituted aryloxy group having from 6 to 30 carbon atoms, e.g., phenoxy, 2-methylphenoxy, 4-t-butylphenoxy, 3-nitrophenoxy, 2-tetradecanoylaminophenoxy), a silyloxy group (preferably a silyloxy group having from 3 to 20 carbon atoms, e.g., trimethylsilyloxy, t-butyldimethylsilyloxy), a heterocyclic-oxy group (preferably a substituted or unsubstituted heterocyclic-oxy group having from 2 to 30 carbon atoms, e.g., 1-phenyltetrazol-5-oxy, 2-tetrahydropyranyloxy), an acyloxy group (preferably a formyloxy group, a substituted or unsubstituted alkylcarbonyloxy group having from 2 to 30 carbon atoms, a substituted or unsubstituted arylcarbonyloxy group having from 6 to 30 carbon atoms, e.g., formyloxy, acetyloxy, pivaloyloxy, stearoyloxy, benzoyloxy, p-methoxyphenylcarbonyloxy), a carbamoyloxy group (preferably a substituted or unsubstituted carbamoyloxy group having from 1 to 30 carbon atoms, e.g., N,N-dimethylcarbamoyloxy, N,N-diethylcarbamoyloxy, morpholinocarbonyloxy, N,N-di-n-octylaminocarbonyloxy, N-n-octylcarbamoyloxy), an alkoxycarbonyloxy group (preferably a substituted or unsubstituted alkoxycarbonyloxy group having from 2 to 30 carbon atoms, e.g., methoxycarbonyloxy, ethoxycarbonyloxy, t-butoxycarbonyloxy, n-octylcarbonyloxy), an aryloxycarbonyloxy group (preferably a substituted or unsubstituted aryloxycarbonyloxy group having from 7 to 30 carbon atoms, e.g., phenoxycarbonyloxy, p-methoxyphenoxycarbonyloxy, p-n-hexadecyloxyphenoxycarbonyloxy), an amino group (preferably an amino group, a substituted or unsubstituted alkylamino group having from 1 to 30 carbon atoms, a substituted or unsubstituted arylamino group having from 6 to 30 carbon atoms, e.g., amino, methylamino, dimethylamino, anilino, N-methylanilino, diphenylamino), an ammonio group (preferably an ammonio group, an ammonio group substituted with a substituted or unsubstituted alkyl, aryl or heterocyclic group having from 1 to 30 carbon atoms, e.g., trimethylammonio, triethylammonio, diphenylmethylammonio), an acylamino group (preferably a formylamino group, a substituted or unsubstituted alkylcarbonylamino group having from 1 to 30 carbon atoms, a substituted or unsubstituted arylcarbonylamino group having from 6 to 30 carbon atoms, e.g., formylamino, acetylamino, pivaloylamino, lauroylamino, benzoylamino, 3,4,5-tri-n-octyloxyphenylcarbonylamino), an aminocarbonylamino group (preferably a substituted or unsubstituted aminocarbonylamino group having from 1 to 30 carbon atoms, e.g., carbamoylamino, N,N-dimethylaminocarbonylamino, N,N-diethylaminocarbonylamino, morpholinocarbonylamino), an alkoxycarbonylamino group (preferably a substituted or unsubstituted alkoxycarbonylamino group having from 2 to 30 carbon atoms, e.g., methoxycarbonylamino, ethoxycarbonylamino, t-butoxycarbonylamino, n-octadecyloxycarbonylamino, N-methyl-methoxycarbonylamino), an aryloxycarbonylamino group (preferably a substituted or unsubstituted aryloxycarbonylamino group having from 7 to 30 carbon atoms, e.g., phenoxycarbonylamino, p-chlorophenoxycarbonylamino, m-n-octyloxyphenoxycarbonylamino), a sulfamoylamino group (preferably a substituted or unsubstituted sulfamoylamino group having from 0 to 30 carbon atoms, e.g., sulfamoylamino, N,N-dimethylaminosulfonylamino, N-n-octylaminosulfonylamino), an alkyl and arylsulfonylamino group (preferably a substituted or unsubstituted alkylsulfonylamino group having from 1 to 30 carbon atoms, a substituted or unsubstituted arylsulfonylamino group having from 6 to 30 carbon atoms, e.g., methylsulfonylamino, butylsulfonylamino, phenylsulfonylamino, 2,3,5-trichlorophenylsulfonylamino, p-methylphenylsulfonylamino), a mercapto group, an alkylthio group (preferably a substituted or unsubstituted alkylthio group having from 1 to 30 carbon atoms, e.g., methylthio, ethylthio, n-hexadecylthio), an arylthio group (preferably a substituted or unsubstituted arylthio group having from 6 to 30 carbon atoms, e.g., phenylthio, p-chlorophenylthio, m-methoxyphenylthio), a heterocyclic-thio group (preferably a substituted or unsubstituted heterocyclic-thio group having from 2 to 30 carbon atoms, e.g., 2-benzothiazolylthio, 1-phenyltetrazol-5-ylthio), a sulfamoyl group (preferably a substituted or unsubstituted sulfamoyl group having from 0 to 30 carbon atoms, e.g., N-ethylsulfamoyl, N-(3-dodecyloxypropyl)sulfamoyl, N<n-dimethylsulfamoyl, N-acetylsulfamoyl, N-benzoylsulfamoyl, N-(N'-phenylcarbamoyl)sulfamoyl), a sulfo group, an alkyl and arylsulfinyl group (preferably a substituted or unsubstituted alkylsulfinyl group having from 1 to 30 carbon atoms, a substituted or unsubstituted arylsulfinyl group having from 6 to 30 carbon atoms, e.g., methylsulfinyl, ethylsulfinyl, phenylsulfinyl, p-methylphenylsulfinyl), an alkyl and arylsulfonyl group (preferably a substituted or unsubstituted alkylsulfonyl group having from 1 to 30 carbon atoms, a substituted or unsubstituted arylsulfonyl group having from 6 to 30 carbon atoms, e.g., methylsulfonyl, ethylsulfonyl, phenylsulfonyl, p-methylphenylsulfonyl), an acyl group (preferably a formyl group, a substituted or unsubstituted alkylcarbonyl group having from 2 to 30 carbon atoms, a substituted or unsubstituted arylcarbonyl group having from 7 to 30 carbon atoms, a substituted or unsubstituted heterocyclic-carbonyl group having from 4 to 30 carbon atoms that bonds to the carbonyl group via the carbon atom, e.g., acetyl, pivaloyl, 2-chloroacetyl, stearoyl, benzoyl, p-n-octyloxyphenylcarbonyl, 2-pyridylcarbonyl, 2-furylcarbonyl), an aryloxycarbonyl group (preferably a substituted or unsubstituted aryloxycarbonyl group having from 7 to 30 carbon atoms, e.g., phenoxycarbonyl, o-chlorophenoxycarbonyl, m-nitrophenoxycarbonyl, p-t-butylphenoxycarbonyl), an alkoxycarbonyl group (preferably a substituted or unsubstituted alkoxycarbonyl group having from 2 to 30 carbon atoms, e.g., methoxycarbonyl, ethoxycarbonyl, t-butoxycarbonyl, n-octadecyloxycarbonyl), a carbamoyl group (preferably a substituted or unsubstituted carbamoyl group having from 1 to 30 carbon atoms, e.g., carbamoyl, N-methylcarbamoyl, N,N-dimethylcarbamoyl, N,N-di-n-octylcarbamoyl, N-(methylsulfonyl)carbamoyl), an aryl and heterocyclic-azo group (preferably a substituted or unsubstituted arylazo group having from 6 to 30 carbon atoms, a substituted or unsubstituted heterocyclic-azo group having from 3 to 30 carbon atoms, e.g., phenylazo, p-chlorophenylazo, 5-ethylthio-1,3,4-thiadiazol-2-ylazo), an imido group (preferably N-succinimido, N-phthalimido), a phosphino group (preferably a substituted or unsubstituted phosphino group having from 2 to 30 carbon atoms, e.g., dimethylphosphino, diphenylphosphino, methylphenoxyphosphino), a phosphinyl group (preferably a substituted or unsubstituted phosphinyl group having from 2 to 30 carbon atoms, e.g., phosphinyl, dioctyloxyphosphinyl, diethoxyphosphinyl), a phosphinyloxy group (preferably a substituted or unsubstituted phosphinyloxy group having from 2 to 30 carbon atoms, e.g., diphenoxyphosphinyloxy, dioctyloxyphosphinyloxy), a phosphinylamino group (preferably a substituted or unsubstituted phosphinylamino group having from 2 to 30 carbon atoms, e.g., dimethoxyphosphinylamino, dimethylaminophosphinylamino), a phospho group, a silyl group (preferably a substituted or unsubstituted silyl group having from 3 to 30 carbon atoms, e.g., trimethylsilyl, t-butyldimethylsilyl, phenyldimethylsilyl), a hydrazino group (preferably a substituted or unsubstituted hydrazino group having from 0 to 30 carbon atoms, e.g., trimethylhydrazino), an ureido group (preferably a substituted or unsubstituted ureido group having from 0 to 30 carbon atoms, e.g., N,N-dimethylureido).

As combined, two W's may form a ring (an aromatic or non-aromatic hydrocarbon ring, or a hetero ring; as further combined, these may form a polycyclic condensed ring; for example, mentioned are a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolidine ring, an indole ring, a benzofuran ring, a benzothiophene ring, an isobenzofuran ring, a quinolidine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxathine ring, a phenothiazine ring, a phenazine ring).

Of the above-mentioned substituents W, those having a hydrogen atom may be further substituted with any of the above-mentioned groups by removing the hydrogen atom. Examples of the substituents of the type are —CONHSO$_2$— (sulfonylcarbamoyl group, carbonylsulfamoyl group), —CONHCO— (carbonylcarbamoyl group), —SO$_2$NHSO$_2$— (sulfonylsulfamoyl group).

More concretely, they include an alkylcarbonylaminosulfonyl group (e.g., acetylaminosulfonyl), an arylcarbonylaminosulfonyl group (e.g., benzoylaminosulfonyl), an alkylsulfonylaminocarbonyl group (e.g., methylsulfonylaminocarbonyl), an arylsulfonylaminocarbonyl group (e.g., p-methylphenylsulfonylaminocarbonyl).

Heterocyclic compounds having at least one lone electron pair for use in the invention are described.

The hetero ring means a cyclic compound having at least one hetero atom. The hetero atom means those except carbon atom and hydrogen atom. The hetero atom is meant to indicate only the atoms that form the cyclic constitutive part of a hetero ring, not including those positioned outside the ring skeleton, those separated from the ring skeleton by at least one non-conjugated single bond, and those that are a part of additional substituents of the ring skeleton. Not specifically defined, the uppermost limit of the number of the hetero atoms is preferably at most 10, more preferably at most 6, even more preferably at most 4.

All heterocyclic compounds satisfying these requirements may be used herein, in which the hetero atom is preferably any of a nitrogen atom, a sulfur atom, an oxygen atom, a selenium atom, a tellurium atom, a phosphorus atom, a silicon atom and a boron atom, more preferably a nitrogen atom, a sulfur atom, an oxygen atom and selenium atom, even more preferably a nitrogen atom, a sulfur atom and an oxygen atom, still more preferably a nitrogen atom and an oxygen atom, most preferably a nitrogen atom.

The number of the members constituting the hetero ring may be any one, but preferably the hetero ring is a 3- to 8-membered ring, more preferably a 5- to 7-membered ring, even more preferably a 5- or 6-membered ring.

The hetero ring may be saturated or unsaturated, but preferably has at least one unsaturated moiety, more preferably at least two unsaturated moieties. In other words, the hetero ring may be any of an aromatic, pseudo-aromatic or non-aromatic ring, but is preferably an aromatic hetero ring or a pseudo-aromatic hetero ring.

Concretely, the hetero ring includes a pyrrole ring, a thiophene ring, a furan ring, an imidazole ring, a pyrazole ring, a thiazole ring, an isothiazole ring, an oxazole ring, an isoxazole ring, a pyridine ring, a pyrazine ring, a pyrimidine ring, a pyridazine ring, an indolidine ring, a triazole ring, an oxadiazole ring, a thiadiazole ring, a tetrazaindene ring, a pentazaindene ring, a hexazaindene ring, a purine ring, a tetrazole ring, a pyrazolotriazole ring, a pyrrolotriazole ring; their benzo-condensed rings such as an indole ring, a benzofuran ring, a benzothiophene ring, an isobenzofuran ring, a quinolidine ring, a quinoline ring, a phthalazine ring, a quinoxaline ring, an isoquinoline ring, a carbazole ring, a phenanthridine ring, a phenanthroline ring, an acridine ring, a benzotriazole ring; and their partly or wholly saturated rings such as a pyrrolidine ring, a pyrroline ring, an imidazoline ring.

The lone electron pair may be referred to as a non-covalent electron pair or a lone pair, and this means an electron pair having two electrons in one orbit and not participating in a covalent bond. Any and every lone electron pair that satisfies this requirement may be in the compound for use herein. Preferably, the lone electron pair in the compound is of the hetero atom that constitutes the hetero ring of the compound, more preferably it is not caught as a part of the π electron in the compound. In other words, it is more desirable that the lone electron pair is in the flat plane of the hetero ring (caught by the SP2 orbit).

Specific examples of the hetero ring having at least one lone electron pair are shown below.

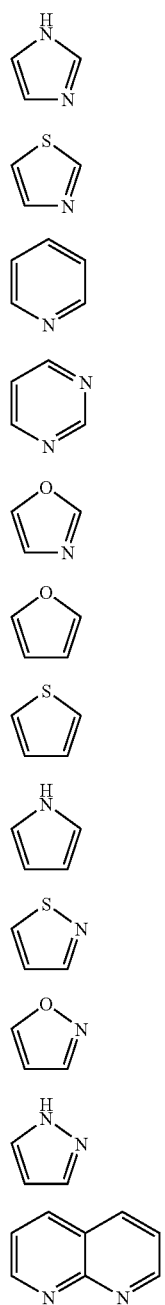

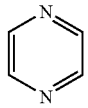
(aa-13)

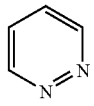
(aa-14)

(aa-15)

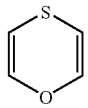
(aa-16)

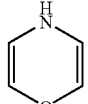
(aa-17)

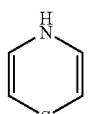
(aa-18)

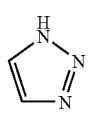
(aa-19)

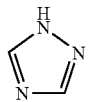
(aa-20)

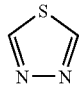
(aa-21)

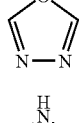
(aa-22)

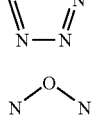
(aa-23)

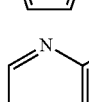
(aa-24)

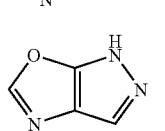
(aa-25)

(aa-26)

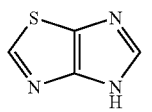 (aa-27)
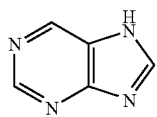 (aa-28)
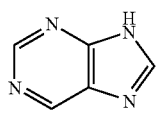 (aa-29)
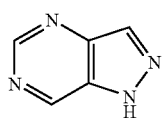 (aa-30)
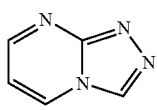 (aa-31)
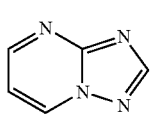 (aa-32)
Examples of benzene-condensed hetero rings are as follows:
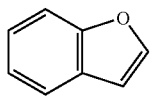 (b-1)
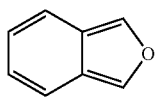 (ab-2)
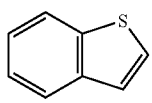 (ab-3)
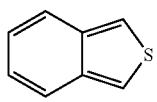 (ab-4)
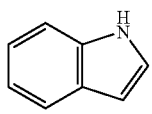 (ab-5)
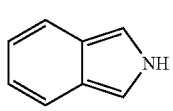 (ab-6)
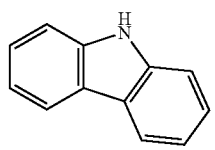 (ab-7)
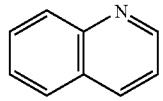 (ab-8)
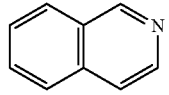 (ab-9)
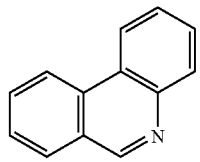 (ab-10)
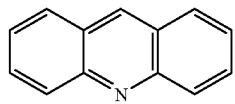 (ab-11)
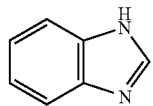 (ab-12)
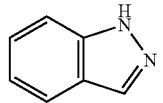 (ab-13)
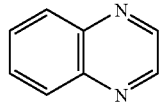 (ab-14)
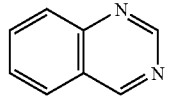 (ab-15)
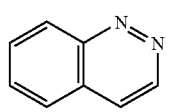 (ab-16)
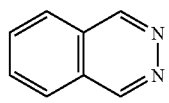 (ab-17)
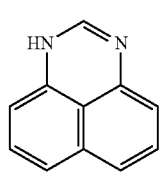 (ab-18)

Examples of partly or wholly-saturated hetero rings are as follows:

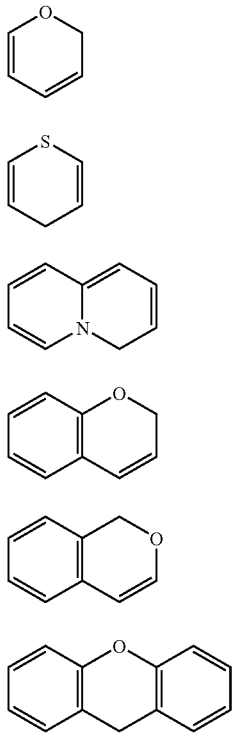

In addition, the following hetero rings are also usable herein.

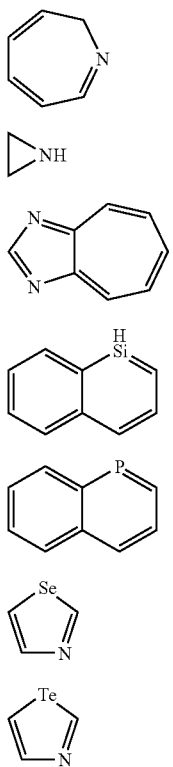

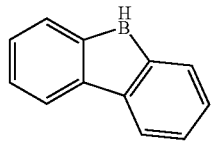

The hetero ring having at least one lone electron pair may be substituted with any substituent and may be condensed with any other ring, for which the substituents may be those mentioned hereinabove for W. The tertiary nitrogen atom in the hetero ring may be substituted to be a quaternary nitrogen atom. Any and every other tautomeric isomer structure, if possible, of the hetero ring is chemically equivalent to each other.

Especially preferred examples of the heterocyclic compound having at least one line electron pair are shown below. Needless-to-say, the invention should not be limited to these.

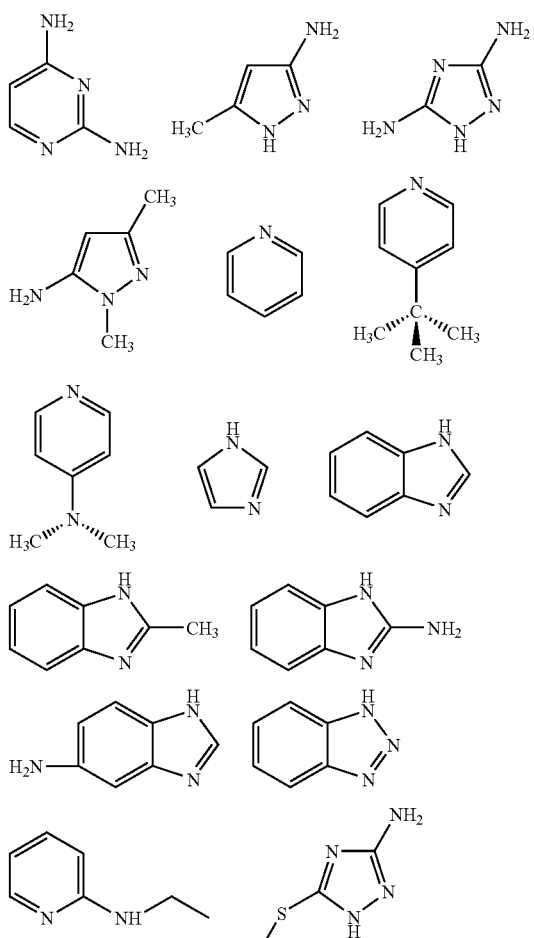

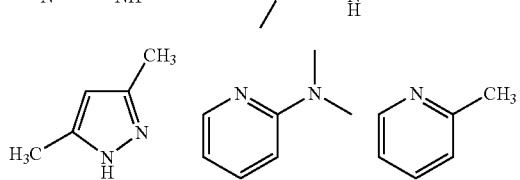

-continued

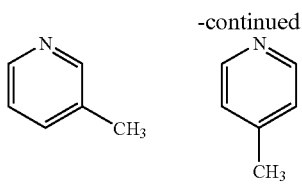

Of the heterocyclic compounds described in Edward C. Taylor, Arnold Weissberger, The Chemistry of Heterocyclic Compounds, A Series of Monographs, Vols. 1 to 59, John Wiley & Sons, and in Robert C. Elderfield, Heterocyclic Compounds, Vols. 1 to 6, John Wiley & Sons, those having at least one lone electron pair are also usable as the heterocyclic compound having at least one lone electron pair in the invention. The heterocyclic compounds having at least one lone electron pair for use in the invention may be produced according to the methods described in these references.

In the invention, it is desirable that, in the compound having at least one lone electron pair, the charge on the lone electron pair-having atom is at most −0.40 (unit $1.6 \times 10^{-19}$ C). The charge of at most −0.40 means that the compound has a negative charge of −0.40 or more. More preferably, the charge is at most −0.5. Also preferably, the energy level of the lone electron pair-having atom is at least −11 eV, more preferably at least −9.5 eV. Especially preferably, the compound has the above-mentioned charge of at most −0.5 and the above-mentioned energy level of at least −9.5 eV. The charge and the energy level in the invention is obtained as the charge on the lone electron pair-having atom and as the energy level of the molecular orbit according to a non-experiential molecular orbital process.

In the non-experiential molecular orbital computation, used is 6-31G basis function under Hartree-Fock (HF) approximation. The charge is computed according to a Merz-Kollman-Singh process [J. Comput. Chem., Vol. 11 (1990) 431]. The computation program used is Gaussian 03[*].

When the molecule has a symmetrical structure, then the structure of the highest symmetry thereof is used fro the computation.

When the compound has at least two lone electron pairs, then the smallest value (largest negative value) is employed for the charge on the atom.

For the energy level of the molecular orbit, herein employed is the highest value of the energy level of the occupied π-orbit that roves on the atom.

[*] Gaussian 03, Revision C.02, M. J. Frisch, G. W. Trucks, H. B. Schlegel, G. E. Scuseria, M. A. Robb, J. R. Cheeseman, J. A. Montgomery, Fr., t. Vreven, K. N. Kudin, J. C. Burant, J. M. Millam, S. S. Iyengar, J. Tomasi, V. Barone, B. Nennucci, M. Cossi, G. Scalmani, N. Rega, G. A. Petersson, H. Nakatsuji, M. Hada, M. Ehara, K. Toyota, R. Fukuda, J. Hasegawa, M. Ishida, T. Nakajima, Y. Honda, O. Kitao, H. Nakai, M. Klene, X. Li, J. E. Knox, H. P. Hratchian, J. B. Cross, C. Adamo, J. Jaramillo, R. Gemperts, R. S. Stratmann, O. Yazyev, A. J. Austin, R. Cammi, C. Pomelli, J. W. Ochterski, P. Y. Ayala, K. Morokuma, G. A. Voth, P. Salvador, J. J. Dannenberg, V. G. Zakrzewski, S. Dapprich, A. D. Daniels, M. C. Starin, O. Farkas, D. K. Malick, A. D. Rabuck, K. Raghavachari, J. B. Foresman, J. V. Ortiz, Q. Cui, A. G. Badoul, S. Clifford, J. Cioslowski, B. B. Stefanov, G. Liu, A. Liashenko, P. Piskorz, I. Komaromi, R. L. Martin, D. J. Fox, t. Keith, M. A. Al-Laham, C. Y. Peng, A. Nanayakkara, M. Challacombe, P. M. W. Gill, B. Johnson, W. Chen, M. W. Wong, C. Gonzalez, and J. A. Pople, Gaussian, Inc., Wallingford Conn., 2004.

In the invention, the flat band potential indicates the flat band potential as measured according to an MS (Mott-Schottky) process. For the MS process, for example, referred to are (1) Akira Fujishima, Masuo Aizawa, Toru Inoue, Electrochemical Determination Method (published by Gihodo); (2) Hiroshi Tsubomura, Photoelectrochemistry and Energy Conversion (published by Tokyo Kagaku Dojin); (3) S. Roy Morrison, Electrochemistry at Semiconductor and Oxidized Metal Electrodes (published by Plenum Press).

In the invention, "negatively change" means that the energy potential is shifted toward a minus direction. When an energy potential is shifted toward a plus direction, then it is referred to as "shifted toward a noble potential".

In the invention, "adding the compound negatively changes the flat band potential as compared with a case not adding it" means that, when the compound is dissolved in a γ-butyrolactone solution with 0.2 M $LiClO_4$ dissolved therein, in an amount of 0.02 M, and when the flat band potential is measured according to the above-mentioned MS process, then the flat band potential thus measured is negative by at least 0.10 V as compared with the blank case (not containing the compound, or that is, the γ-butyrolactone solution with 0.2 M $LiClO_4$ alone dissolved therein). The MS determination is effected at 25° C., and the dissolved oxygen in the sample solution is purged with argon. For the determination, used is a nano-porous $SnO_2$ substrate applied on a ITO or FTO conductive glass sheet, and the frequency in measurement is from 200 to 2000 Hz. When the compound could not dissolve in the 0.2M $LiClO_4$-dissolved γ-butyrolactone solution to a concentration of 0.02 M, then the compound is dissolved in the solution up to its saturated concentration, and the solution having the saturated concentration of the compound is used for the determination test.

An embodiment of the invention applied to an electrochromic device is described in detail hereinunder.

In the invention, "optical density" means a value A calculated according to the following numerical formula (1) in which $I_0$ indicates the intensity of the incident light to the electrochromic device (optical density-changing element), and $I_T$ indicates the intensity of the transmitted light through the device:

$$A = -\log(I_T/I_0) \quad (1)$$

In the invention, "nano-porous material" means a material of which the surface has been processed to have nanometer-order projections and recesses for increasing its surface area in order that the material may thereby adsorb more substances. The degree of porosity may be represented by "roughness factor". In the invention, "roughness factor of the nano-porous semiconductor material" is the ratio of the actually effective surface area to the projected plane of the corresponding semiconductor material layer surface. Concretely, it may be determined according to a BET process. Preferably, the roughness factor is at least 10, more preferably at least 30, even more preferably at least 100.

In the invention, "decolored state" means that the optical density of an electrochromic device is kept as low as possible by short-circuiting both electrodes of the electrochromic device, or by applying an inverse voltage to both electrodes thereof, or that is, by applying thereto a voltage in the positive/negative direction inverse to the voltage to be applied for coloration.

In the invention, "semiconductor material doped with an impurity element" is by general definition. For example, according to Dictionary of Physics (by Baifu-kan), "impurity semiconductor" is a semiconductor which contains an impurity such as donor or acceptor and of which the electric conduction is governed by the electron or the hole supplied by the impurity. Taking it in the broad sense of the word, the impurity semiconductor is defined as one that has a defect and a deep impurity. The invention encompasses the impurity semiconductor to be taken as the broad sense of the word as above.

In the invention, "dope" indicates "doping", and this is by general definition. For example, according to Dictionary of Physics (by Baifu-kan), "doping" means adding a small amount of an impurity to crystals, and its technique includes an alloying process, a diffusion process, an ion implantation process.

In the invention, "adsorption of an electrochromic material by a nano-porous semiconductor material" indicates a phenomenon that an electrochromic material bonds to the surface of a nano-porous semiconductor material by chemical bonding (covalent bonding, coordination bonding, hydrogen bonding) or physical bonding, and the adsorption is by general definition. The amount of adsorption of electrochromic material by the surface of nano-porous semiconductor material may be detected, for example, according to the method mentioned below.

A nano-porous semiconductor material that has probably adsorbed an electrochromic material is dipped in a 0.1 M NaOH solution and shaken at 40° C. for 3 hours. The amount of the solution to be used in this case shall be determined depending on the coating amount of the nano-porous semiconductor material, and it is suitably 0.5 ml per 1 $g/m^2$ of the coating amount. After thus shaken, the absorption spectrum of the solution is determined by the use of a spectrophotometer. The type and the concentration of the dipping solution to be used (in this case, NaOH), the shaking temperature and time shall be determined depending on the type of the nano-porous semiconductor material and the electrochromic material used, and therefore should not be limited to the above.

In the invention, "electromagnetic waves" is by general definition. For example, according to Dictionary of Physics (by Baifu-kan), an electric field and a magnetic field include a static field that is constant relative to time and a wave field that varies in time and diffuses to a remote space; and the wave field is defined as electromagnetic waves. Concretely, it is classified into γ rays, X rays, UV rays, visible rays, IR rays, electric waves. The electromagnetic waves to which the invention is directed include all of these, When the optical device of the invention is applied to a dimmer system of a camera unit, then the electromagnetic waves to which the device is directed are preferably UV rays, visible rays and IR rays, more preferably visible rays.

The electrochromic device capable of having a spectral sensitivity near to the spectral sensitivity of an image-taking film, which is favorable for use as a dimmer filter, is such that, in a colored state of the device, the distribution of the mean value of the optical density thereof at a wavelength of from 450 to 470 nm, the mean value of the optical density thereof at a wavelength of from 540 to 560 nm, and the mean value of the optical density thereof at a wavelength of from 630 to 650 nm (the difference between the maximum value and the minimum value of the three mean values) is at most 0.5 (preferably at most 0.3) in terms of the optical density thereof. More preferably, the mean value of the optical density of the electrochromic device in a colored state at a wavelength of from 450 to 470 nm, the mean value of the optical density thereof at a wavelength of from 540 to 560 nm, and the mean value of the optical density thereof at a wavelength of from 630 to 650 nm are all at least 0.5 (more preferably at least 0.8, even more preferably at least 0.95). One typical constitutional example of the electrochromic device (optical density-changing element) of the invention is shown in FIG. 1 which is a schematic cross-sectional view of the device.

In the invention, the electrochromic device of such that, in a colored state thereof, the distribution of (a) the mean value of the optical density of the device at a wavelength of from 450 to 470 nm, (b) the mean value of the optical density thereof at a wavelength of from 540 to 560 nm, and (c) the mean value of the optical density thereof at a wavelength of from 630 to 650 nm is at most 0.5 in terms of the optical density thereof means that the difference between the maximum value and the minimum value of the three optical density data of (a), (b) and (c) is at most 0.5. The distribution is preferably at most 0.5 in terms of the optical density, more preferably at most 0.3 in terms of the optical density, most preferably at most 0.1 in terms of the optical density.

Regarding the color hue of the colored state of the electrochromic device and the color hue of the image-recording media (e.g., photographic material, CCD, CMOS) in the image-taking unit comprising the device, it is desirable that the spectral sensitivity of the two overlaps with each other in a broader range.

When the electrochromic device of the invention is applied to a dimmer device in an image-taking (preferably, camera) unit or the like, then the device preferably has an absorption characteristic near to neutral gray of uniformly absorbing incident light; and the electrochromic device (optical density-changing element) preferably absorbs visible rays, more preferably visible rays of plural different wavelengths, even more preferably blue light, green light and red light. Preferably, the mean value of the optical density of the device is as in the above-mentioned item (10).

"Neutral gray" as referred to in the invention means that the absorption spectrum of the colored state of the electrochromic device is uniform throughout the entire region of a wavelength range of from 400 to 700 nm ("uniform" means that the difference between the mean value of the optical density at a wavelength of from 400 to 700 nm and the optical density at each wavelength is small, and, for example, this means that the optical density difference is 0.1), and not limited thereto, this further includes a case where the color hue of the colored state of the device greatly overlaps with the color hue of the recording media of the image-taking unit comprising the device, and therefore the device is substantially "neutral gray" for the image-taking unit.

The optical device of the invention comprises at least an electromotive force-generating element capable of generating an electromotive force in response to electromagnetic waves, and an optical density-changing element for changing the optical density of the device by the electromotive force (electrochromic device). An electromotive force is generated by the electromotive force-generating element in response to electromagnetic waves, and the optical density of the electrochromic device changes in accordance with the electromotive force. Accordingly, the optical device of the invention may be utilized as a dimmer device for changing the quantity of light transmission in accordance with the intensity of electromagnetic waves.

The rate of change of the optical density of the electrochromic device relative to the electromotive force generated by the electromotive force-generating element may be varied in accordance with the application of the device. For example, when the quantity of light to be applied to a lens-combined film is modulated by the device, then the electromotive force is preferably so generated that the rate of change of the quantity of light may be as equal as possible to the rate of change of the optical density.

The elements of the optical device of the invention are described below.

In the invention, "element for generating an electromotive force (electromotive force-generating element)" means an element of converting the energy of electromagnetic waves to electric energy. Concretely, one typical example is a solar cell for converting sunlight into electric energy. The material of constituting a solar cell includes single-crystal silicon, polycrystalline silicon, amorphous silicon, and compounds such as cadmium telluride, indium copper selenide. Any known solar cell comprising any of these materials may be used in the optical device of the invention, suitably selected in accordance with the use of the device.

The techniques described in Nature, Vol. 353, pp. 737–740 (1991), U.S. Pat. No. 4,927,721, and JP-A 2002-75443, relating to photoelectric conversion devices comprising a color-sensitized oxide semiconductor (hereinafter referred to as color-sensitized photoelectric conversion devices) and photoelectrochemical cells comprising the device, are also utilized for the electromotive force-generating element in the invention. The color-sensitized photoelectric conversion devices are also preferred for the electromotive force-generating element in the invention.

An electromagnetic wave sensor and a voltage source may be combined to construct the electromotive force-generating element for use herein. Not specifically defined, the electromagnetic wave sensor in this case may include phototransistors, Cad sensors, photodiodes, CCD, CMOS, NMOS, solar cells. The material of the electromagnetic wave sensor may be suitably selected in accordance with the wavelength of the electromagnetic waves to which the sensor is to be sensitive. The directivity of the electromagnetic wave sensor to electromagnetic waves is preferably as high as possible.

The electromagnetic wave sensor may be the same as an image-taking device. For example, in a case of a digital still camera, CCD, CMOS or NMOS used for the image-taking device therein may also serve as an electromagnetic wave sensor. Not specifically defined, the voltage source may be a dry cell, etc. The dry cell as referred to herein may be any of primary cells such as alkali dry cell, manganese dry cell; and secondary cells such as nickel-cadmium cell, nickel-hydrogen cell, lithium ion cell.

The electromotive force-generating element preferred in the invention is a solar cell comprising a material of single-crystal silicon, polycrystalline silicon or amorphous silicon, a color-sensitized photoelectric conversion device, and a combination of a phototransistor and a dry cell. When the optical device of the invention is applied to an image-taking (preferably camera) unit, then the electromotive force-generating element therein is preferably one capable of generating an electromotive force in accordance with the intensity of the electromagnetic waves (especially sunlight) applied to the device.

In the invention, "element for changing optical density (optical density-changing element=electrochromic device)" is meant to indicate an element capable of changing the optical density of the device in accordance with the electromotive force generated by the electromotive force-generating element, or that is, the electric energy generated by the element, to thereby change the electromagnetic wave transmittance of the device.

The electrochromic device (optical density-changing element) comprises a porous material having adsorbed a material capable of changing the optical density of the device in accordance with electric energy (electrochromic material), and further comprises a support that carries an electroconductive coating, and a charge-transporting material that participates in electroconductivity in the electrochromic device. FIG. 1 shows one typical constitutional example of such an electrochromic device. In FIG. 1, the electrochromic material is adsorbed by the porous material (33a, 33b). The electrochromic material changes its optical density in accordance with the electric energy applied thereto through the upper and lower electroconductive coating 32 and porous material 33. In accordance with the change of the optical density of the electrochromic material, the electromagnetic waves hυ going in the device are absorbed by the electrochromic material, and the quantity of light transmission through the device thereby changes. The form of the electrochromic device is not limited to that of FIG. 1, and the device may have any other various forms in accordance with its use. For example, it includes optical filter, lens, stop, mirror, window, eyeglass, display panel, etc. In an image-taking (preferably camera) unit, the device is preferably an optical filter, a lens or a stop.

Not specifically defined, the material of the support of constituting the electrochromic device includes glass, plastics, polyethylene terephthalate (PET), polyethylene naphthalate (PEN), triacetyl cellulose (TAC), polycarbonate (PC), polysulfone, polyether sulfone (PES), polyether-ether ketone, polyphenylene sulfide, polyarylate (PAR), polyamide, polyimide (PIM), polystyrene, norbornene resin (ARTON), acrylic resin, polymethyl methacrylate (PMMA). Depending on the use and the form of the device, the support may be suitably selected from these. Preferably in the invention, the support has a small absorption of electromagnetic waves to which the optical device of the invention is directed. Concretely, glass, PET, PEN, TAC or acrylic resin is preferred for light with $\lambda$=400 nm to 700 nm. For evading the transmitted light loss owing to the reflection on the support surface, it is desirable that an antireflection layer (e.g., thin layer of silicon oxide) is formed on the surface of the support. In addition, any other various functional layers may be formed on the support surface, including, for example, a shock-absorbing layer for preventing shock to the device, an abrasion-resistant layer for preventing the device from being damaged by friction, an electromagnetic wave-absorbing layer for cutting unnecessary electromagnetic waves (e.g., UV light in optical devices for visible light). For a UV absorbent and a filter layer containing it and formed on a transparent support, for example, compounds (I-1) to (VIII-3) in JP-A 2001-147319 are known as UV absorbents.

Not specifically defined, the material of the electroconductive layer of constituting the electrochromic device includes a metal thin film (e.g., gold, silver, copper, chromium, palladium, tungsten and their alloys), an oxide semiconductor film (e.g., tin oxide, silver oxide, zinc oxide, vanadium oxide, ITO (tin oxide-doped indium oxide), antimony-doped tin oxide (ATO), FTO (fluorine-doped tin oxide), AZO (aluminium-doped zinc oxide)), an electroconductive nitride thin film (e.g., titanium nitride, zirconium nitride, hafnium nitride), an electroconductive boride thin film (e.g., $LaB_6$), a spinel-type compound (e.g., $MgInO_4$, $CaGaO_4$), an electroconductive polymer film (e.g., polypyrrole/$FeCl_3$), an ion-conductive film (e.g., polyethylene oxide/$LiClO_4$), an inorganic/organic hybrid film (e.g., indium oxide fine powder/saturated polyester resin). Preferably, the material for the layer is selected from those having a small absorption of electromagnetic waves to which the optical device of the invention is directed. Concretely, tin oxide, FTO and ITO are especially preferred for light with $\lambda$=400 nm to 700 nm. In order to more efficiently reduce the absorption of the electromagnetic waves to which the device is directed, the electroconductive layer is preferably as thin as possible within a range within which it may ensure the desired electroconductivity. Concretely, the thickness of the electroconductive layer is at most 1000 nm, more preferably at most 200 nm, even more preferably at most 100 nm.

Not specifically limited thereto, examples of the porous material of constituting the electrochromic device are mentioned below, including semiconductor materials such as metal oxides, metal sulfides and metal nitrides, and metals.

Not specifically limited thereto, the metal oxides are, for example, titanium oxide, zinc oxide, silicon oxide, lead oxide, tungsten oxide, tin oxide, indium oxide, niobium oxide, cadmium oxide, bismuth oxide, aluminium oxide, gallium(III) oxide, ferrous oxide, and their composite compounds, as well as these compounds doped with any of fluorine, chlorine, antimony, phosphorus, arsenic, boron, aluminium, indium, gallium, silicon, germanium, titanium, zirconium, hafnium, tin. In addition, also usable herein are titanium oxide coated with any of ITO, antimony-doped tin oxide or FTO.

Also not specifically limited thereto, the metal sulfides are, for example, zinc sulfide, cadmium sulfide, and their composite compounds, as well as these compounds doped with any of aluminium, gallium, indium. In addition, also usable herein are any other materials coated with a metal sulfide.

Also not specifically limited thereto, the metal nitrides are, for example, aluminium nitride, gallium nitride, indium nitride, and their composite compounds, as well as these compounds doped with a small amount of any other atom (e.g., tin, germanium). In addition, also usable herein are other materials coated with a metal nitride. For the material to be used for the filter part in the invention, preferably selected are those having a small absorption of electromagnetic waves to which the optical device of the invention is directed. Concretely preferred is titanium oxide, tin oxide, zinc oxide, zinc sulfide or gallium nitride for light with $\lambda$=400 nm to 700 nm; and more preferred is tin oxide or zinc oxide.

In the invention, an electrochromic material is adsorbed by the porous material as above, whereby a smooth electron flow in and out of the electrochromic material is realized and the optical density change in the electrochromic device (optical density-changing element) within a short period of time is therefore enabled. When the amount of the electrochromic material adsorbed by the porous material is larger, then the device enables coloration at a higher density. In order that the porous material can adsorb a larger amount of an electrochromic material, it is specifically processed to have a nano-porous surface and its surface area is thereby increased. Preferably, the nano-porous material has a roughness factor of at least 10, more preferably at least 30, even more preferably at least 100.

For forming such a porous material, for example, herein employable is a method of bonding nanometer-order ultrafine particles to the material. In this case, the size and the size distribution of the particles to be used are optimized whereby the transmitted light loss that may be caused by absorption or scattering of electromagnetic waves by a semiconductor material may be minimized. The size of the particles to be used is preferably at most 100 nm, more preferably from 1 nm to 60 nm, even more preferably from 2 nm to 40 nm. Regarding the size distribution thereof, the particles may be monodispersed or polydispersed, depending on the use thereof. Preferably, monodispersed particles having a different particle size may be mixed for use herein.

In the invention, the porous material having adsorbed such an electrochromic material may form two or more layers. The layers of the porous material may have the same composition or may have a different composition, A porous material having adsorbed an electrochromic material and a porous material not having adsorbed an electrochromic material may be combined for use herein.

The electrochromic material of constituting the electrochromic device includes organic dyes such as viologen dye, phenothiazine dye, styryl dye, ferrocene dye, anthraquinone dye, pyrazoline dye, fluoran dye, phthalocyanine dye; electroconductive polymer compounds such as polystyrene, polythiophene, polyaniline, polypyrrole, polybenzine, polyisothianaphthene; and inorganic compounds such as tungsten oxide, iridium oxide, nickel oxide, cobalt oxide, vanadium oxide, molybdenum oxide, titanium oxide, indium oxide, chromium oxide, manganese oxide, prussian blue, indium nitride, tin nitride, zirconium chloride nitride.

In the invention, when a specific part of an organic compound is referred to as a "group", then the part may not be substituted by itself or may be substituted with one or more (up to a possibly largest number of) substituents. For example, "alkyl group" means a substituted or unsubstituted alkyl group.

When the substituent of the type is represented by W, then the substituent for W may be any and every one with no specific limitation thereon. For example, it includes a halogen atom, an alkyl group (including a cycloalkyl group, a bicycloalkyl group, a tricycloalkyl group), an alkenyl group (including a cycloalkenyl group, a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group (including an alkylamino group, an arylamino group, a heterocyclic amino group), an ammonio group, an acylamino group, an aminocarbonylamino group, an alkoxycarbonylamino group, an aryloxycarbonylamino group, a sulfamoylamino group, an alkyl and arylsulfonylamino group, a mercapto group, an alkylthio group, an arylthio group, a heterocyclic-thio group, a sulfamoyl group, a sulfo group, an alkyl and arylsulfinyl group, an alkyl and arylsulfonyl group, an acyl group, an aryloxycarbonyl group, an alkoxycarbonyl group, a carbamoyl group, an aryl and heterocyclic-azo group, an imido group, a phosphino group, a phosphinyl group, a phosphinyloxy group, a phosphinylamino group, a phosphono group, a silyl group, a hydrazino group, an ureido group, a boronic acid group (—B(OH)$_2$), a phosphato group (—OPO(OH)$_2$), a sulfato group (—OSO$_3$H), and other known substituents.

As combined, two W's may form a ring (an aromatic or non-aromatic hydrocarbon ring, or a hetero ring; as further combined, these may form a polycyclic condensed ring; for example, mentioned are a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolidine ring, an indole ring, a benzofuran ring, a benzothiophene ring, an isobenzofuran ring, a quinolidine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxathine ring, a phenothiazine ring, a phenazine ring).

Of the above-mentioned substituents W, those having a hydrogen atom may be further substituted with any of the above-mentioned groups by removing the hydrogen atom. Examples of the substituents of the type are —CONHSO$_2$— (sulfonylcarbamoyl group, carbonylsulfamoyl group), —CONHCO— (carbonylcarbamoyl group), —SO$_2$NHSO$_2$— (sulfonylsulfamoyl group). More concretely, they include an alkylcarbonylaminosulfonyl group (e.g., acetylaminosulfonyl), an arylcarbonylaminosulfonyl group (e.g., benzoylaminosulfonyl), an alkylsulfonylaminocarbonyl group (e.g., methylsulfonylaminocarbonyl), an arylsulfonylaminocarbonyl group (e.g., p-methylphenylsulfonylaminocarbonyl).

Viologen dyes are, for example, compounds having a structure of the following formula (1), (2) or (3):

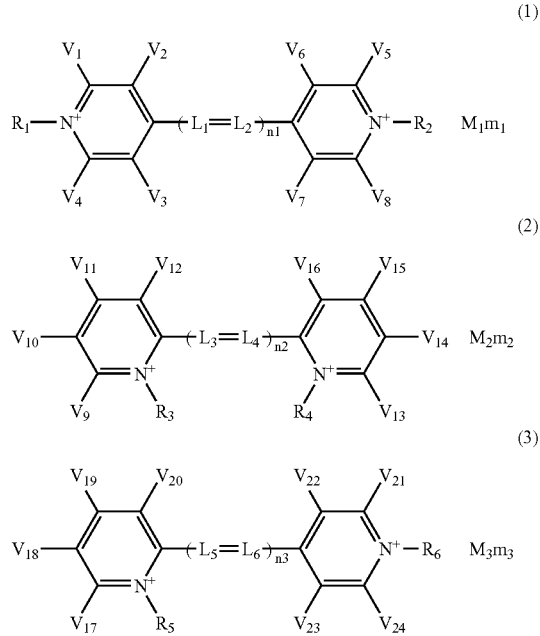

In formulae (1), (2), (3), $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$, and $V_{24}$, each independently represent a hydrogen atom or a monovalent substituent.

$R_1$, $R_2$, $R_3$, $R_4$, $R_5$ and $R_6$ each independently represent a hydrogen atom, an alkyl group, an aryl group or a heterocyclic group.

$L_1$, $L_2$, $L_3$, $L_4$, $L_5$ and $L_6$ each independently represent a methine group or a nitrogen atom.

$n_1$, $n_2$ and $n_3$ each independently indicate 0, 1 or 2.

$M_1$, $M_2$ and $M_3$ each independently represent a charge-balancing pair ion; $m_1$, $m_2$ and $m_3$ each independently indicate 0 or a number necessary for neutralizing the charge of the molecule.

$V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each independently represent a hydrogen atom or a monovalent substituent; and V's may bond to each other or may form a ring. They may bond to any other $R_1$ to $R_6$, and $L_1$ to $L_6$. For the monovalent substituent, referred to are those mentioned hereinabove for W.

$R_1$, $R_2$, $R_3$, $R_4$, $R_5$ and $R_6$ each independently represent a hydrogen atom, an alkyl group, an aryl group or a heterocyclic group, preferably an alkyl group, an aryl group or a heterocyclic group, more preferably an alkyl group or an aryl group, even more preferably an alkyl group.

Concretely, preferred examples of the alkyl group, the aryl group and the heterocyclic group for $R_1$ to $R_6$ are mentioned below. The alkyl group is preferably an unsubstituted alkyl group having from 1 to 18 carbon atoms, more preferably from 1 to 7 carbon atoms, even more preferably from 1 to 4 carbon atoms (e.g., methyl, ethyl, propyl, isopropyl, butyl, isobutyl, hexyl, octyl, dodecyl, octadecyl), or a substituted alkyl group having from 1 to 18 carbon atoms, more preferably from 1 to 7 carbon atoms, even more preferably from 1 to 4 carbon atoms (for example, an alkyl group substituted with any of the above-mentioned substituents W; preferably an alkyl group having an acid group). The acid group is described. The acid group is a group having a dissociable proton. Concretely, for example, it includes a sulfo group, a carboxyl group, a sulfato group, —CONHSO$_2$—(sulfonylcarbamoyl group, carbonylsulfamoyl group), —CONHCO—(carbonylcarbamoyl group), —SO$_2$NHSO$_2$— (sulfonylsulfamoyl group), a sulfonamido group, a sulfamoyl group, a phosphato group (—OP(=O)(OH)$_2$), a phosphono group (—P(=O) (OH)$_2$), a boronic acid group, a phenolic hydroxyl group and others in which the proton is dissociated depending on their pKa and the ambient pH. For example, preferred for use herein is a proton-dissociable acid group capable of dissociating to a degree of at least 90% at a pH of from 5 to 11. More preferred are a sulfo group, a carboxyl group, —CONHSO$_2$—, —CONHCO—, —SO$_2$NHSO$_2$—, a phosphato group and a phosphono group; even more preferred are a carboxyl group, a phosphato group and a phosphono group; still more preferred are a phosphato group and a phosphono group; and most preferred is a phosphono group.

Concretely, herein preferred are an aralkyl group (e.g., benzyl, 2-phenylethyl, 2-(4-biphenyl)ethyl, 2-sulfobenzyl, 4-sulfobenzyl, 4-sulfophenethyl, 4-phosphobenzyl, 4-carboxybenzyl), an unsaturated hydrocarbon group (e.g., allyl group, vinyl group; in this, the substituted alkyl group includes an alkenyl group and an alkynyl group), a hydroxyalkyl group (e.g., 2-hydroxyethyl, 3-hydroxypropyl), a carboxyalkyl group (e.g., carboxymethyl, 2-carboxyethyl, 3-carboxypropyl, 4-carboxybutyl), a phosphatalkyl group (e.g., phosphatomethyl, 2-phosphatoethyl, 3-phosphatopropyl, 4-phosphatobutyl), a phosphonoalkyl group (e.g., phosphonomethyl, 2-phosphonoethyl, 3-phosphonopropyl, 4-phosphonobutyl), an alkoxyalkyl group (e.g., 2-methoxyethyl, 2-(2-methoxyethoxy)ethyl), an aryloxyalkyl group (e.g., 2-phenoxyethyl, 2-(4-biphenyloxy)ethyl, 2-(1-naphthoxy)ethyl, 2-(4-sulfophenoxy)ethyl, 2-(2-phosphophenoxy)ethyl), an alkoxycarbonylalkyl group (e.g., ethoxycarbonylmethyl, 2-benzyloxycarbonylethyl), an aryloxycarbonylalkyl group (e.g., 3-phenoxycarbonylpropyl, 3-sulfophenoxycarbonylpropyl), an acyloxyalkyl group (e.g., 2-acetyloxyethyl), an acylalkyl group (e.g., 2-acetylethyl), a carbamoylalkyl group (e.g., 2-morpholinocarbonylethyl), a sulfamoylalkyl group (e.g., N,N-dimethylsulfamoylmethyl), a sulfoalkyl group (e.g., 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl, 3-(2-pyridyl)-3-sulfopropyl), a sulfoalkenyl group, a sulphatoalkyl group (e.g., 2-sulphatoethyl, 3-sulphatopropyl, 4-sulphatobutyl), a hetero ring-substituted alkyl group (e.g., 2-(pyrrolidin-2-on-1-yl)ethyl, 2-(2-pyridyl)ethyl, tetrahydrofurfuryl, 3-pyridiniopropyl), an alkylsulfonylcarbamoylalkyl group (e.g., methanesuflonylcarbamoylmethyl), an acylcarbamoylalkyl group (e.g., acetylcarbamoylmethyl), an acylsulfamoylalkyl group (e.g., acetylsulfamoylmethyl), an alkylsulfonylsulfamoylalkyl group (e.g., methanesulfonylsulfamoylmethyl), an ammonioalkyl group (e.g., 3-(trimethylammonio)propyl, 3-ammoniopropyl), an aminoalkyl group (e.g., 3-aminopropyl, 3-(dimethylamino)propyl, 4-(methylamino)butyl), a guanidinoalkyl group (e.g., 4-guanidinobutyl); and a substituted or unsubstituted aryl group preferably having from 6 to 20 carbon atoms, more preferably from 6 to 10 carbon atoms, even more preferably from 6 to 8 carbon atoms (in which the substituted aryl group may be an aryl group substituted with any of the above-mentioned substituents W; especially preferred is an aryl group having an acid group; more preferred is an aryl group substituted with a carboxyl group, a phosphato group or a phosphono group; even more preferred is an aryl group substituted with a phosphato group or a phosphono group; and most preferred is an aryl group substituted with a phosphono group; concretely, it includes phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatophenyl, 4-phosphonophenyl); and a substituted or unsubstituted heterocyclic group preferably having from 1 to 20 carbon atoms, more preferably from 3 to 10 carbon atoms, even more preferably from 4 to 8 carbon atoms (in which the substituted heterocyclic group may be a heterocyclic group substituted with any of the above-mentioned substituents W; preferred is a heterocyclic group having an acid group; more preferred is a heterocyclic group substituted with a carboxyl group, a phosphato group or a phosphono group; even more preferred is a heterocyclic group substituted with a phosphato group or a phosphono group; most preferred is a heterocyclic group substituted with a phosphono group; concretely it includes 2-furyl, 2-thienyl, 2-pyridyl, 3-pyrazolyl, 3-isoxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 3-(1,2,4-triazolyl), 5-tetrazolyl, 5-methyl-2-thienyl, 4-methoxy-2-pyridyl, 4-sulfo-2-pyridyl, 4-carboxy-2-pyridyl, 4-phosphato-2-pyridyl, 4-phosphono-2-pyridyl).

These may bond to any other R, $V_1$ to $V_{24}$, and $L_1$ to $L_6$.

$L_1$, $L_2$, $L_3$, $L_4$, $L_5$ and $L_6$ each independently represent a methine group or a nitrogen atom, preferably a methine group. The methine group represented by $L_1$ to $L_6$ may have a substituent, for which the substituent may be those mentioned hereinabove for W. For example, the substituent includes a substituted or unsubstituted alkyl group having from 1 to 15, preferably from 1 to 10, more preferably from 1 to 5 carbon atoms (e.g., methyl, ethyl, 2-carboxyethyl, 2-phosphatoethyl, 2-phosphonoethyl), a substituted or unsubstituted aryl group having from 6 to 20, preferably from 6 to 15, more preferably from 6 to 10 carbon atoms (e.g., phenyl, o-carboxyphenyl, o-phosphatoethyl, o-phosphonophenyl), a substituted or unsubstituted heterocyclic group having from 3 to 20, preferably from 4 to 15, more preferably from 6 to 10 carbon atoms (e.g., N,N-dimethylbarbituric acid group), a halogen atom (e.g., chlorine, bromine, iodine, fluorine), an alkoxy group having from 1 to 15, preferably from 1 to 10, more preferably from 1 to 5 carbon atoms (e.g., methoxy, ethoxy), an amino group having from 0 to 15, preferably from 2 to 10, more preferably from 4 to 10 carbon atoms (e.g., methylamino, N,N-dimethylamino, N-methyl-N-phenylamino, N-methylpiperazino), an alkylthio group having from 1 to 15, preferably from 1 to 10, more preferably from 1 to 5 carbon atoms (e.g., methylthio, ethylthio), an arylthio group having from 6 to 20, preferably from 6 to 12, more preferably from 6 to 10 carbon atoms (e.g., phenylthio, p-methylphenylthio). Optionally combined with any other methine group, they may form a ring. In addition, they may bond to $V_1$ to $V_{24}$, and $R_1$ to $R_6$.

$n_1$, $n_2$ and $n_3$ each independently indicate 0, 1 or 2, preferably 0 or 1, more preferably 0. When $n_1$ to $n_3$ is 2 or more, then the methine group or the nitrogen atom may be repeated, but they may not be the same.

$M_1$, $M_2$ and $M_3$ are in the formula for indicating the presence of a cation or an anion therein when they are needed for neutralizing the ionic charge of the compound. Typical examples of the cation are hydrogen ion ($H^+$); inorganic cations such as an alkali metal ion (e.g., sodium ion, potassium ion, lithium ion), an alkaline earth metal ion (e.g., calcium ion); and organic ions such as an ammonium ion (e.g., ammonium ion, tetraalkylammonium ion, triethylammonium ion, pyridinium ion, ethylpyridinium ion, 1,8-diazabicyclo[5.4.0]-7-undecenium ion). The anion may be any of an inorganic anion or an organic anion, including, a halide ion (e.g., fluoride ion, chloride ion, iodide ion), a substituted arylsulfonate ion (e.g., p-toluenesulfonate ion, p-chlorobenzenesulfonate ion), an aryldisulfonate ion (e.g., 1,3-benzenesulfonate ion, 1,5-naphthalenedisulfonate ion, 2,6-naphthalenedisulfonate ion), an alkylsulfate ion (e.g., methylsulfate ion), a sulfate ion, a thiocyanate ion, a perchlorate ion, a tetrafluoroborate ion, a picrate ion, an acetate ion, a trifluoromethanesulfonate ion. Further employable herein are other dyes having a charge opposite to the charge of ionic polymers or dyes. In addition, when $CO_2^-$, $SO_3^-$ and $P(=O) (—O^-)_2$ has a hydrogen ion as its pair ion, then they may be expressed as $CO_2H$, $SO_3H$, and $P(=O) (—OH)_2$.

$m_1$, $m_2$ and $m_3$ each independently indicate 0 or a number necessary for neutralizing the charge of the molecule, preferably a number of from 0 to 4, more preferably a number of from 0 to 2. When the compound forms an inner salt, then they are 0.

Specific examples of the compounds of viologen dyes are shown below, to which, however, the invention should not be limited.

V-1

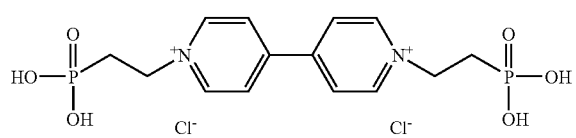

-continued
V-2
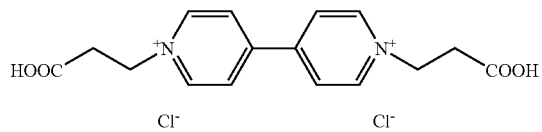
V-3
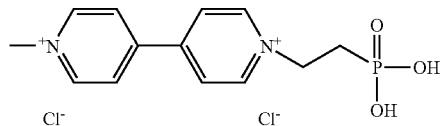
V-4
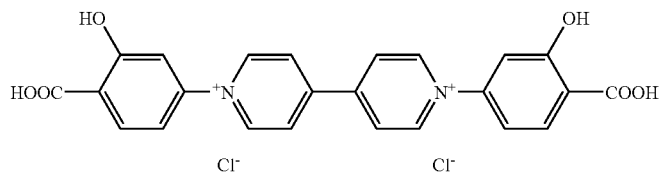
V-5
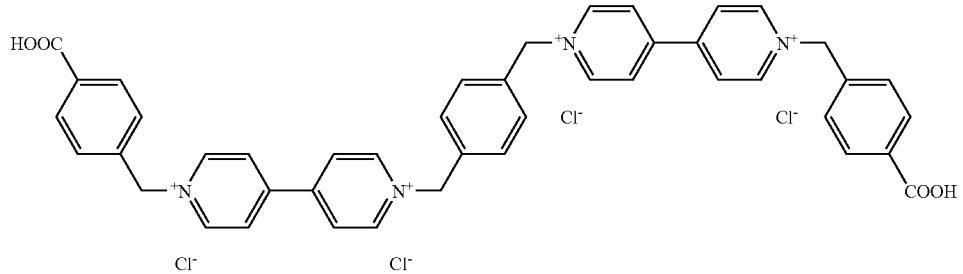
V-6
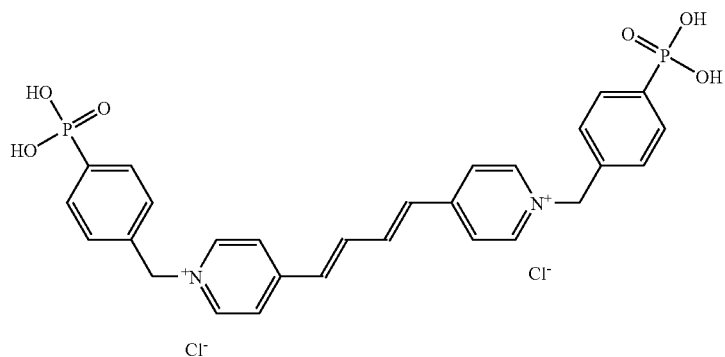
V-7
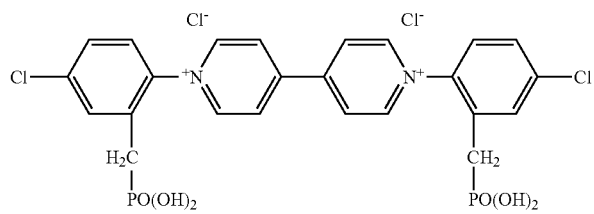
V-8
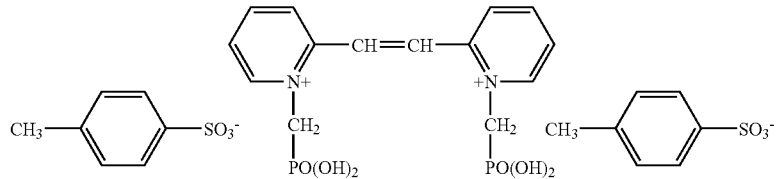

-continued
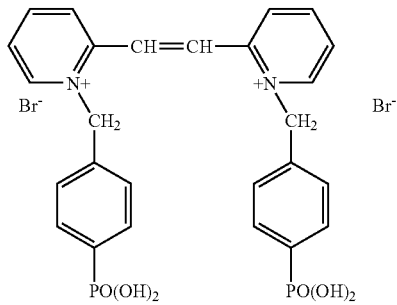
V-9
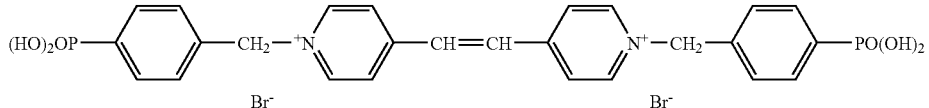
V-10
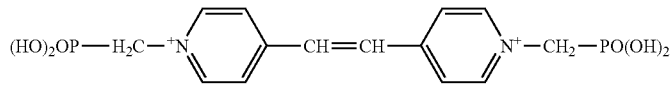
V-11
V-12
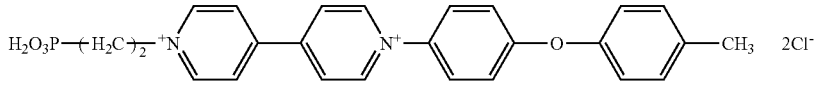
V-13
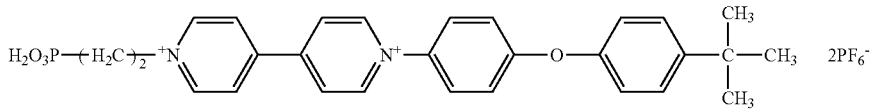
V-14
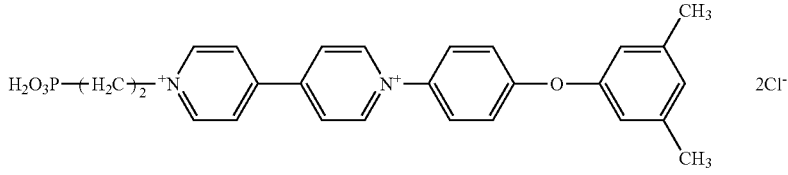
V-15
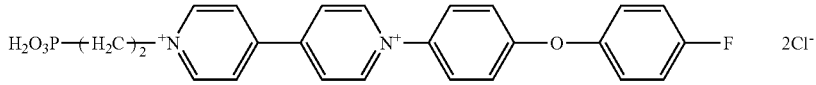
V-16
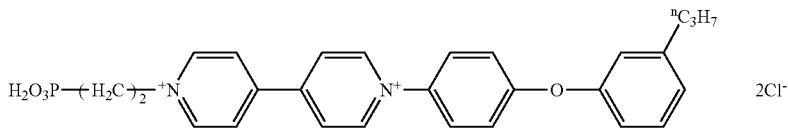
V-17
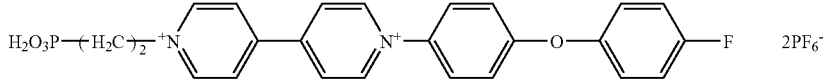
V-18
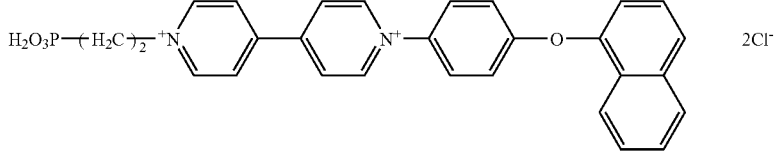

Also preferred as the dye compounds for use herein are compounds (1) to (33) described in claim 4 in a pamphlet of WO04/067673. The above-mentioned viologen dyes are preferably used as the electrochromic material in the invention.

Phenothiazine dyes are compounds having a structure of the following formula (6):

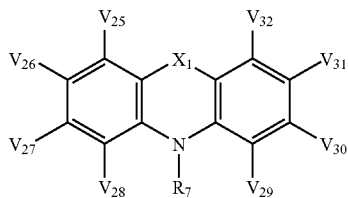

(6)

In formula (6), $V_{25}$, $V_{26}$, $V_{27}$, $V_{28}$, $V_{29}$, $V_{30}$, $V_{31}$, and $V_{32}$ each independently represent a hydrogen atom or a monovalent substituent; and these V's may bond to each other or may form a ring, or may bond to the other $R_7$.

For the monovalent substituent, referred to are those mentioned hereinabove for W.

$R_7$ represents a hydrogen atom, an alkyl group, an aryl group or a heterocyclic group, preferably an alkyl group, an aryl group or a heterocyclic group, more preferably an alkyl group or an aryl group, even more preferably an alkyl group. Concretely, preferred examples of the alkyl group, the aryl group and the heterocyclic group for $R_7$ are mentioned below. The alkyl group is preferably an unsubstituted alkyl group having from 1 to 18 carbon atoms, more preferably from 1 to 7 carbon atoms, even more preferably from 1 to 4 carbon atoms (e.g., methyl, ethyl, propyl, isopropyl, butyl, isobutyl, hexyl, octyl, dodecyl, octadecyl), or a substituted alkyl group having from 1 to 18 carbon atoms, more preferably from 1 to 7 carbon atoms, even more preferably from 1 to 4 carbon atoms (for example, an alkyl group substituted with any of the above-mentioned substituents W; preferably an alkyl group having an acid group). The acid group has the same meaning as that in the "acid group-having alkyl group" mentioned hereinabove for $R_1$; and its specific examples and preferred examples are the same as those mentioned hereinabove for $R_1$.

Concretely, also preferred are an aralkyl group (e.g., benzyl, 2-phenylethyl, 2-(4-biphenyl)ethyl, 2-sulfobenzyl, 4-sulfobenzyl, 4-sulfophenethyl, 4-phosphobenzyl, 4-carboxybenzyl), an unsaturated hydrocarbon group (e.g., allyl group, vinyl group; in this, the substituted alkyl group includes an alkenyl group and an alkynyl group), a hydroxyalkyl group (e.g., 2-hydroxyethyl, 3-hydroxypropyl), a carboxyalkyl group (e.g., carboxymethyl, 2-carboxyethyl, 3-carboxypropyl, 4-carboxybutyl), a phosphatoalkyl group (e.g., phosphatomethyl, 2-phosphatoethyl, 3-phosphatopropyl, 4-phosphatobutyl), a phosphonoalkyl group (e.g., phosphonomethyl, 2-phosphonoethyl, 3-phosphonopropyl, 4-phosphonobutyl), an alkoxyalkyl group (e.g., 2-methoxyethyl, 2-(2-methoxyethoxy)ethyl), an aryloxyalkyl group (e.g., 2-phenoxyethyl, 2-(4-biphenyloxy)ethyl, 2-(1-naphthoxy)ethyl, 2-(4-sulfophenoxy)ethyl, 2-(2-phosphophenoxy)ethyl), an alkoxycarbonylalkyl group (e.g., ethoxycarbonylmethyl, 2-benzyloxycarbonylethyl), an aryloxycarbonylalkyl group (e.g., 3-phenoxycarbonylpropyl, 3-sulfophenoxycarbonylpropyl), an acyloxyalkyl group (e.g., 2-acetyloxyethyl), an acylalkyl group (e.g., 2-acetylethyl), a carbamoylalkyl group (e.g., 2-morpholinocarbonylethyl), a sulfamoylalkyl group (e.g., N,N-dimethylsulfamoylmethyl), a sulfoalkyl group (e.g., 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl, 3-(2-pyridyl)-3-sulfopropyl), a sulfoalkenyl group, a sulphatoalkyl group (e.g., 2-sulphatoethyl, 3-sulphatopropyl, 4-sulphatobutyl), a hetero ring-substituted alkyl group (e.g., 2-(pyrrolidin-2-on-1-yl)ethyl, 2-(2-pyridyl)ethyl, tetrahydrofurfuryl, 3-pyridiniopropyl), an alkylsulfonylcarbamoylalkyl group (e.g., methanesuflonylcarbamoylmethyl), an acylcarbamoylalkyl group (e.g., acetylcarbamoylmethyl), an acylsulfamoylalkyl group (e.g., acetylsulfamoylmethyl), an alkylsulfonylsulfamoylalkyl group (e.g., methanesulfonylsulfamoylmethyl), an ammonioalkyl group (e.g., 3-(trimethylammonio)propyl, 3-ammoniopropyl), an aminoalkyl group (e.g., 3-aminopropyl, 3-(dimethylamino)propyl, 4-(methylamino)butyl), a guanidinoalkyl group (e.g., 4-guanidinobutyl); and a substituted or unsubstituted aryl group preferably having from 6 to 20 carbon atoms, more preferably from 6 to 10 carbon atoms, even more preferably from 6 to 8 carbon atoms (in which the substituted aryl group may be an aryl group substituted with any of the above-mentioned substituents W; especially preferred is an aryl group having an acid group; more preferred is an aryl group substituted with a carboxyl group, a phosphato group or a phosphono group; even more preferred is an aryl group substituted with a phosphato group or a phosphono group; and most preferred is an aryl group substituted with a phosphono group; concretely, it includes phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatophenyl, 4-phosphonophenyl); and a substituted or unsubstituted heterocyclic group preferably having from 1 to 20 carbon atoms, more preferably from 3 to 10 carbon atoms, even more preferably from 4 to 8 carbon atoms (in which the substituted heterocyclic group may be a heterocyclic group substituted with any of the above-mentioned substituents W; preferred is a heterocyclic group having an acid group; more preferred is a heterocyclic group substituted with a carboxyl group, a phosphato group or a phosphono group; even more preferred is a heterocyclic group substituted with a phosphato group or a phosphono group; most preferred is a heterocyclic group substituted with a phosphono group; concretely it includes 2-furyl, 2-thienyl, 2-pyridyl, 3-pyrazolyl, 3-isoxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 3-(1,2,4-triazolyl), 5-tetrazolyl, 5-methyl-2-thienyl, 4-methoxy-2-pyridyl, 4-sulfo-2-pyridyl, 4-carboxy-2-pyridyl, 4-phosphato-2-pyridyl, 4-phosphono-2-pyridyl).

These may bond to $V_{25}$ to $V_{32}$.

$X_1$ represents a sulfur atom, an oxygen atom, a nitrogen atom (N—Ra), a carbon atom (CVaVb) or a selenium atom, preferably a sulfur atom. Ra represents a hydrogen atom, an alkyl group, an aryl group or a heterocyclic group, which may be the same as those mentioned hereinabove for $R_1$ to $R_7$. The same preferred for these R's are also preferred for Ra. Va and Vb each represent a hydrogen atom or a monovalent substituent, which may be the same as those mentioned hereinabove for $V_1$ to $V_{32}$ and $R_1$ to $R_7$. The same preferred for these V's and R's are also preferred for Va and Vb.

Specific examples of the phenothiazine dye compounds are mentioned below, to which, however, the invention should not be limited.

P-1

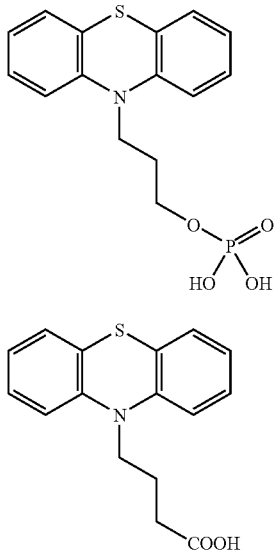

P-2

Styryl dyes are compounds having a basic skeleton of the following formula (7):

(7)

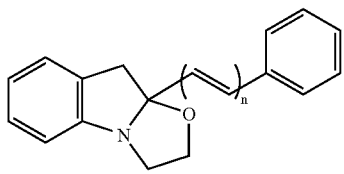

In the formula, n indicates from 1 to 5. The compounds may have any substituent at any position in the formula. Preferably, the compounds have an adsorptive substituent such as a carboxyl group, a sulfonic acid group or a phosphonic acid group. Specific examples of the compounds are mentioned below, to which, however, the invention should not be limited.

S-1

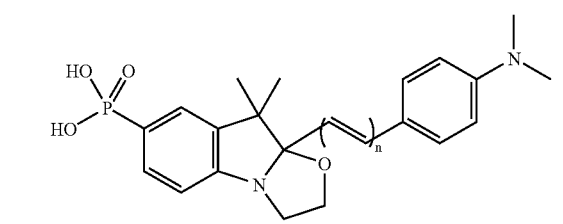

S-2

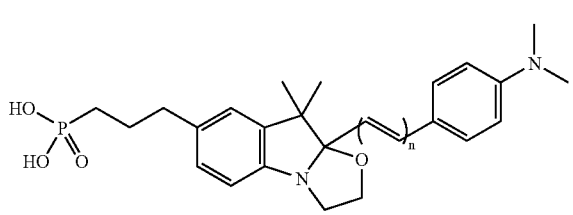

-continued

S-3

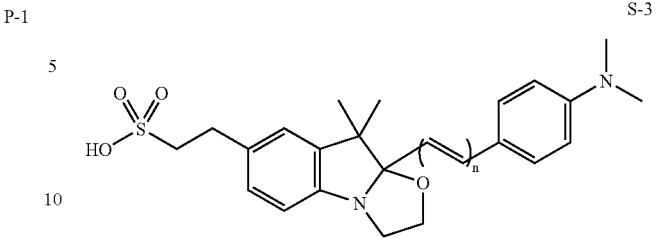

Of those electrochromic materials, the organic compounds can control the absorption wavelength by changing their substituents. Preferably, two or more different types of electrochromic materials for changing optical density may be combined to construct an electrochromic device (optical density-changing element) capable of changing the optical density at different wavelengths.

When the optical device of the invention is applied to a dimmer device in an image-taking (preferably, camera) unit or the like, then the device preferably has an absorption characteristic near to neutral gray of uniformly absorbing optical light; and the electrochromic device (optical density-changing element) preferably absorbs visible rays, more preferably visible rays of plural different wavelengths, even more preferably blue light, green light and red light. Preferably, the mean value of the optical density of the device is as in the above-mentioned item (10) and/or (11). The above-mentioned (10) and/or (11) can be realized by a single material that enables electron transfer and can change the spectral in a wavelength range of from 400 nm to 700 nm as a result of electron transfer, or by a combination of two or more such materials. Viologen dyes are preferred for single use in the device; and preferred combinations of two or more dyes are viologen dye/phenothiazine dye, viologen dye/ferrocene dye, phthalocyanine dye/prussian blue, viologen dye/nickel oxide, viologen dye/iridium oxide, tungsten oxide/phenothiazine dye, viologen dye/phenothiazine dye/styryl dye, two different viologen dyes (these differ in their substituents)/phenothiazine dye, two different viologen dyes (these differ in their substituents)/styryl dye, two different viologen dyes (these differ in their substituents)/nickel oxide.

The charge-transporting material is a material having a function charge transportation owing to its ionic conductivity and/or electroconductivity. The charge-transporting material includes, for example, the following four different types. [1] Liquid electrolyte (that is, electrolytic solution) (for example, refer to "Introduction to Chemistry—Material Chemistry of New-Type Cells" (edited by the Chemical Society of Japan), No. 49, p. 109 (2001), Table 1); [2] polymer electrolyte (for example, refer to "Introduction to Chemistry—Material Chemistry of New-Type Cells" (edited by the Chemical Society of Japan), No. 49, p. 118 (2001), FIG. 8); [3] solid electrolyte (for example, refer to "Introduction to Chemistry—Material Chemistry of New-Type Cells" (edited by the Chemical Society of Japan), No. 49, p. 123 (2001)); [4] cold fusible salt (for example, refer to "Introduction to Chemistry—Material Chemistry of New-Type Cells" (edited by the Chemical Society of Japan), No. 49, p. 129 (2001)). The responsiveness of electrochromic devices depends on the ionic conductivity of the charge-transporting material in the device. Therefore, when the responsiveness of the device is important, then the liquid electrolyte [1] having a high ionic conductivity is preferred for the charge-transporting material in the device. In practical use, however, it may require a specific measure for preventing liquid loss owing to liquid leakage or vaporization.

For promoting the electrochemical reaction of the electrochromic material, a promoter compound may be in the electrochromic device (optical density-changing element). The promoter compound may be or may not be oxidized or reduced. The promoter compound may or may not change the optical density at $\lambda$=400 nm to 700 nm through oxidation-reduction reaction. Like the electrochromic material, the promoter compound may exist on a metal oxide or may be dissolved in an electrolytic solution, or may form a single layer by itself on an electroconductive layer. Preferably, the promoter compound is on the anode of an electrochromic device, in which it enables electron transfer thereon but does not substantially change the spectral absorption at a wavelength of from 400 nm to 700 nm as a result of electron transfer through it.

When the charge-transporting material of the electrochromic device (optical density-changing element) is an electrolytic solution, then the electrolytic solution contains a solvent and a supporting electrolyte and may contain a promoter compound therein. The supporting electrolyte does not undergo electrochemical reaction at all by itself, but participates in increasing the electroconductivity through charger transfer via it. The solvent is preferably a polar solvent. Concretely, for example, it may be a single solvent or a mixed solvent of two or more selected from water; alcohols such as methanol, ethanol; carboxylic acids such as acetic acid; acetonitrile, propionitrile, glutaronitrile, adiponitrile, methoxyacetonitrile, dimethylacetamide, methylpyrolidinone, formamide, N,N-dimethylformamide, dimethylsulfoxide, dimethoxyethane, propylene carbonate, ethylene carbonate, γ-butyrolactone, tetrahydrofuran, dioxolane, sulforane, trimethyl phosphate, pyridine, hexamethylene acid triamide, polyethylene glycol.

The supporting electrolyte acts as a charge carrier in the form of an ion in a solvent, and it is a salt comprising a combination of easily-ionizable anion and cation. The cation includes metal ions such as typically $Li^+$, $Na^+$, $K^+$, $Rb^+$, $Cs^+$; and quaternary ammonium ions such as typically tetrabutylammonium ion. The anion includes halide ions such as typically $Cl^-$, $Br^-$, $I^-$, $F^-$; and sulfate ion, nitrate ion, perchlorate ion, tosylate ion, tetrafluoroborate ion, hexafluorophosphate ion. Other electrolytes employable herein are fused salts such as typically LiCl/KCl; solid electrolytes such as typically ion conductors, ultra-ion conductors; and solid polyelectrolytes such as typically membrane-shaped ion-conductive substances, e.g., ion-exchange membranes.

Preferably, the optical device of the invention is so designed that its optical density at $\lambda$=400 nm in a decolored state is not higher than 0.2 (preferably not higher than 0.125), by suitably combining the materials of the electrochromic device (optical density-changing element) therein, or that is, by optimizing the type of the support, the electroconductive layer and the electrochromic material therein and by optimizing the type and the particle size of the porous material therein. Similarly, it is also desirable that the mean value of the optical density at $\lambda$=400 nm to 500 nm in a decolored state, the mean value of the optical density at $\lambda$=500 nm to 600 nm in a decolored state, and the mean value of the optical density at $\lambda$=600 nm to 700 nm in a decolored state are all at most 0.1. On the other hand, it is desirable that the mean value of the optical density at $\lambda$=400 nm to 700 nm in a colored state after response to irradiation with electromagnetic waves is at least 0.5, more preferably at least 0.8, even more preferably at least 0.95.

In the optical device of the invention, the electrochromic device (optical density-changing element) and the electromotive force-generating element may be in direct connection to each other or may be connected to each other via a circuit having a function of amplification or protection. Preferably, the device has a resistor connected in parallel to the electrochromic device (optical density-changing element), therefore having a circuit constitution of promoting the applied voltage cut-off in a light cut-off state.

The optical device of the invention may be applied to any of window materials for vehicles, display devices, camera-related optical devices, etc. One application example of exhibiting the effectiveness of the optical device of the invention is a camera-related optical device. The device of the invention is effective for any image-taking (preferably camera) unit including large-size or middle-size cameras, single-lens reflex cameras, compact cameras, lens-combined films, digital cameras, broadcasting cameras, movie film cameras, movie digital cameras, image-taking (preferably camera) units for mobile phones, 8-mm movie cameras, etc. One specific application of the device of the invention capable of more significantly exhibiting its characteristics is a simple image-taking system not requiring any complicated control mechanism such as typically a lens-combined film. Another application also capable of significantly exhibiting the characteristics of the invention is a digital camera with CCD or CMOS as its image-taking device, and this may compensates the narrow dynamic range of the image-taking device therein.

When the optical device of the invention is mounted on an image-taking unit, then it is desirable that the electrochromic device is installed on the optical axis of the image-taking lens therein.

Preferably, the color hut in the colored state of the electrochromic device is near to the color hut of the image-recording medium contained in the image-taking unit. The image-recording medium as referred to herein is as follows: When the image-taking unit is a lens-combined film, then the medium is the color negative film installed therein; when the unit is an electronic still camera, then the medium is CCD or CMOS of the camera; when the unit is a camera-combined mobile phone, then the medium is CCD of the camera. Preferably, the color hue in the colored state of the electrochromic device and the color hue of the image-recording medium contained in the image-taking unit overlap with each other in their spectral sensitivity. In other words, "neutral gray" as referred to in the invention means that the absorption spectrum of the colored state of the electrochromic device is uniform throughout the entire region of a wavelength range of from 400 to 700 nm ("uniform" means that the difference between the mean value of the optical density at a wavelength of from 400 to 700 nm and the optical density at each wavelength is small, and, for example, this means that the optical density difference is 0.1), and not limited thereto, this further includes a case where the color hue of the colored state of the device greatly overlaps with the color hue of the recording medium of the image-taking unit comprising the device, and therefore the device is substantially "neutral gray" for the image-taking unit.

EXAMPLES

The invention is described with reference to the following Examples, to which, however, the invention should not be limited.

Example 1

Polyethylene glycol (molecular weight, 20,000) was added to an aqueous dispersion of tin oxide having a mean diameter of 5 nm, and uniformly stirred to prepare a coating liquid. For the substrate to be coated, herein used was an antireflection film-coated ITO conductive glass sheet (thickness, 0.7 mm). The coating liquid was uniformly applied onto the ITO film of the transparent conductive glass sheet. After coated, this was heated up to 450° C., taking 100 minutes, and then baked at 450° C. for 30 minutes to remove the polymer. The coating and baking was repeated until the overall coating amount of tin oxide could be 7 g/m², and a tin oxide nano-porous electrode having a uniform thickness was thus obtained. The electrode thus formed according to the method as above had a surface roughness factor of about 400.

An electrolytic solution was prepared by dissolving lithium perchlorate in a solvent of γ-butyrolactone in an amount of 0.2 mol/liter. A compound of No. 1 to No. 11 mentioned below was added to the electrolytic solution separately in an amount of 0.02 mol/liter, and dissolved therein. These are referred to as Example 101 to Example 111. Specifically, in Comparative Example, lithium perchlorate alone was added; and in Example 101, lithium perchlorate and compound No. 1 were added. The same shall apply to the other Examples 102 to 111.

The tin oxide nano-porous material-carrying electroconductive glass substrate that had been prepared in the above was partly dipped in the solution, and subjected to MS measurement. Table 1 shows the rate of change of the flat band potential of each Example to a base potential, and the charge and the energy level.

TABLE 1

| Sample No. | Compound | Rate of Change of Flat Band Potential to Base Potential | Charge | Energy Level |
| --- | --- | --- | --- | --- |
| Comparative Example | no | 0 | | |
| Example 101 | No. 1 | 0.4 | −0.45 | −8.31 |
| Example 102 | No. 2 | 0.55 | −0.54 | −8.28 |
| Example 103 | No. 3 | 0.45 | −0.60 | −7.75 |
| Example 104 | No. 4 | 0.4 | −0.62 | −7.69 |
| Example 105 | No. 5 | 0.45 | −0.66 | −7.45 |
| Example 106 | No. 6 | 0.3 | −0.74 | −9.36 |
| Example 107 | No. 7 | 0.4 | −0.75 | −9.23 |
| Example 108 | No. 8 | 0.65 | −0.79 | −8.33 |
| Example 109 | No. 9 | 0.6 | −0.84 | −8.24 |
| Example 110 | No. 10 | 0.7 | −0.80 | −7.86 |
| Example 111 | No. 11 | 0.7 | −0.81 | −7.36 |

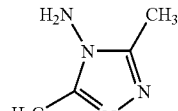

No. 1

No. 2

No. 3

No. 4

No. 5

No. 6

No. 7

No. 8

TABLE 1-continued

| Sample No. | Compound | Rate of Change of Flat Band Potential to Base Potential | Charge | Energy Level |
|---|---|---|---|---|
| No. 9 |  | | | |
| No. 10 | 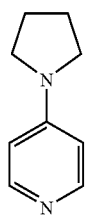 | | | |
| No. 11 | 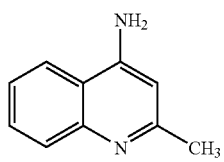 | | | |

Accordingly, it is obvious that adding a lone electron pair-having compound negatively shifts the flat band potential.

Example 2

A method of fabricating a sample 202 (the invention) of the electrochromic device of the invention and that for a sample 201 (comparative sample) are described.

(1) Fabrication of Sample 201 (Comparative Example):

A sample 201 (comparative example) was fabricated according to a method comprising (i) coating with tin oxide nanoparticles for cathode, (ii) coating with tin oxide nanoparticles for anode, (iii) adsorption of electrochromic dye, and (iv) assembling into electrochromic device in that order.

(i) Coating with Tin Oxide Nanoparticles for Cathode:

Polyethylene glycol (molecular weight, 20,000) was added to an aqueous dispersion of tin oxide having a diameter of about 40 nm, and uniformly stirred to prepare a coating liquid. For the substrate to be coated, herein used was an antireflection film-coated ITO conductive glass sheet (thickness, 0.7 mm). The coating liquid was uniformly applied onto the ITO film of the transparent conductive glass sheet in such a manner that the amount of coating tin oxide could be 9 g/m$^2$. After coated, the glass substrate was baked at 450° C. for 30 minutes to form a tin oxide nano-porous electrode thereon. The electrode thus formed according to the method as above had a surface roughness factor of about 400.

(ii) Coating with Tin Oxide Nanoparticles for Anode:

Polyethylene glycol (molecular weight, 20,000) was added to an aqueous dispersion of tin oxide having a mean diameter of 5 nm, and uniformly stirred to prepare a coating liquid. For the substrate to be coated, herein used was an antireflection film-coated ITO conductive glass sheet (thickness, 0.7 mm). The coating liquid was uniformly applied onto the ITO film of the transparent conductive glass sheet. After coated, this was heated up to 450° C., taking 100 minutes, and then baked at 450° C. for 30 minutes to remove the polymer. The coating and baking was repeated until the overall coating amount of tin oxide could be 7 g/m$^2$, and a tin oxide nano-porous electrode having a uniform thickness was thus obtained. The electrode thus formed according to the method as above had a surface roughness factor of about 400.

(iii) Adsorption of Electrochromic Dye:

As an electrochromic dye, herein used were chromic dyes V-1 and P-1. The chromic dye V-1 colors, after reduced; while the chromic dye P-1 colors, after oxidized. V-1 was dissolved in water while P-1 was in chloroform, each in a concentration of 0.15 mol/liter. In the V-1 solution, dipped was the tin oxide nano-porous electrode for cathode prepared in (i); while in the P-1 solution, dipped was the tin oxide anode-porous electrode for anode prepared in (ii), whereby the dye was adsorbed by the nano-porous substrate. After the dye adsorption, the glass substrates were washed with the respective solvent, and then dried in vacuum. Thus, dye-adsorbed nano-porous materials were produced.

(iv) Assembling into Electrochromic Device:

The (V-1)-adsorbed tin oxide nano-porous substrate and the (P-1)-adsorbed tin oxide nano-porous substrate prepared in (iii) were used. The two were assembled into a device in such a manner that the nano-porous material parts of the two could face each other (FIG. 1). The space between the thus-assembled electrochromic device was filled with an electrolytic solution of the γ-butyrolactone solution of lithium perchlorate dissolved therein in an amount of 0.2 mol/liter, and sealed up. The electrolytic solution was dewatered and degassed before use herein. When the thus-fabricated electrochromic device sample 201 (Comparative Example) was electrically circuited with the (V-1)-adsorbed tin oxide nano-porous material electrode thereof connected to a minus electrode and the (P-1) adsorbed tin oxide nano-porous material electrode thereof to a plus electrode, then the device gave a color; and when the two electrodes were short-circuited, then the color of the device disappeared.

(2) Fabrication of Sample 202 (the Invention):

A sample 202 (the invention) was fabricated like the sample 201 (comparative example). This differs from the sample 201 (comparative example) in point of the step (ii) of coating with nanoparticles for anode and the step (iv) assembling into electrochromic device, but the others are the same between the two.

(ii) Coating with Nanoparticles for Anode;

An aqueous dispersion of Sb-doped tin oxide (Si-doping ratio, 10%) having a mean particle size of 5 nm was mixed with an aqueous dispersion of tin oxide having a mean diameter of 5 nm, in an amount of 10% by weight of the former. Further, polyethylene glycol (molecular weight, 20,000) was added to it, and uniformly stirred to prepare a coating liquid. For the substrate to be coated, herein used was an antireflection film-coated ITO conductive glass sheet (thickness, 0.7 mm). The coating liquid was uniformly applied onto the ITO film of the transparent conductive glass sheet. After coated, this was heated up to 450° C., taking 100 minutes, and then baked at 450° C. for 30 minutes to remove the polymer. The coating and baking was repeated until the overall coating amount of tin oxide could be 7 g/m², and a tin oxide nano-porous electrode having a uniform thickness was thus obtained. The electrode thus formed according to the method as above had a surface roughness factor of about 400.

(iv) Assembling into Electrochromic Device:

The (V-1)-adsorbed tin oxide nano-porous substrate and the (P-1)-adsorbed tin oxide nano-porous substrate prepared in (iii) were used. The two were assembled into a device in such a manner that the nano-porous material parts of the two could face each other (FIG. 1). The space between the thus-assembled electrochromic device was filled with an electrolytic solution of the γ-butyrolactone solution of lithium perchlorate and compound No. 8 both dissolved therein in an amount of 0.2 mol/liter and 0.02 mol/liter, respectively, and sealed up. The electrolytic solution was dewatered and degassed before use herein. When the thus-fabricated electrochromic device sample 202 (the invention) was electrically circuited with the (V-1)-adsorbed tin oxide nano-porous material electrode thereof connected to a minus electrode and the (P-1) adsorbed tin oxide nano-porous material electrode thereof to a plus electrode, then the device gave a color; and when the two electrodes were short-circuited, then the color of the device disappeared.

The optical density in a decolored state of the sample 201 (comparative example) and the sample 202 (the invention), and the colored Δ optical density thereof (=Optical density in a colored state—optical density in a decolored state) are shown in Table 2. When the electrochromic device is used as a dimmer filter, then the optical density thereof in a decolored state is preferably as low as possible, and the colored Δ optical density thereof is preferably as high as possible.

TABLE 2

| | Optical Density in Decolored State | Colored Δ Optical Density |
|---|---|---|
| Sample 201 (comparative example) | 0.05 | 0.5 |
| Sample 202 (the invention) | 0.05 | 0.92 |

As in Table 2, the sample 202 (the invention) had a higher colored Δ optical density than that of the sample 201 (comparative example), and its quality was better than that of the latter.

Example 3

This is to demonstrate an embodiment of the electrochromic device sample 202 of the invention mounted on a lens-combined film unit.

Figure 2:
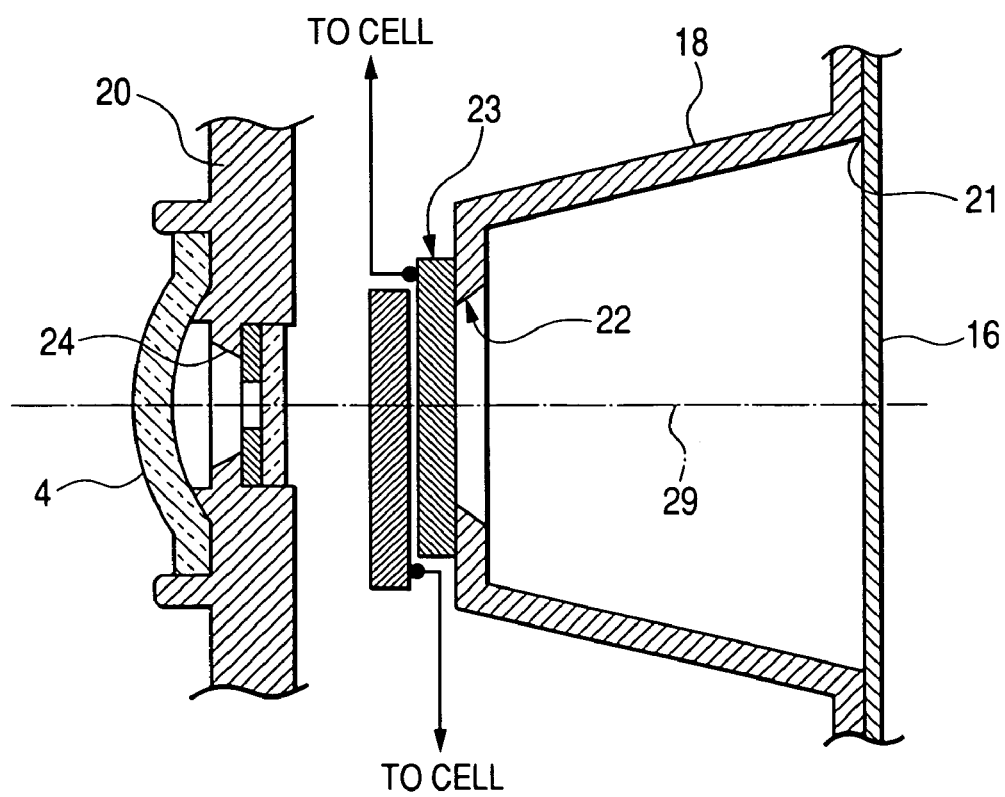
FIG. 2 is a schematic cross-sectional view of an essential part of a lens-combined film unit that has an optical device of the invention.
Figure 3:
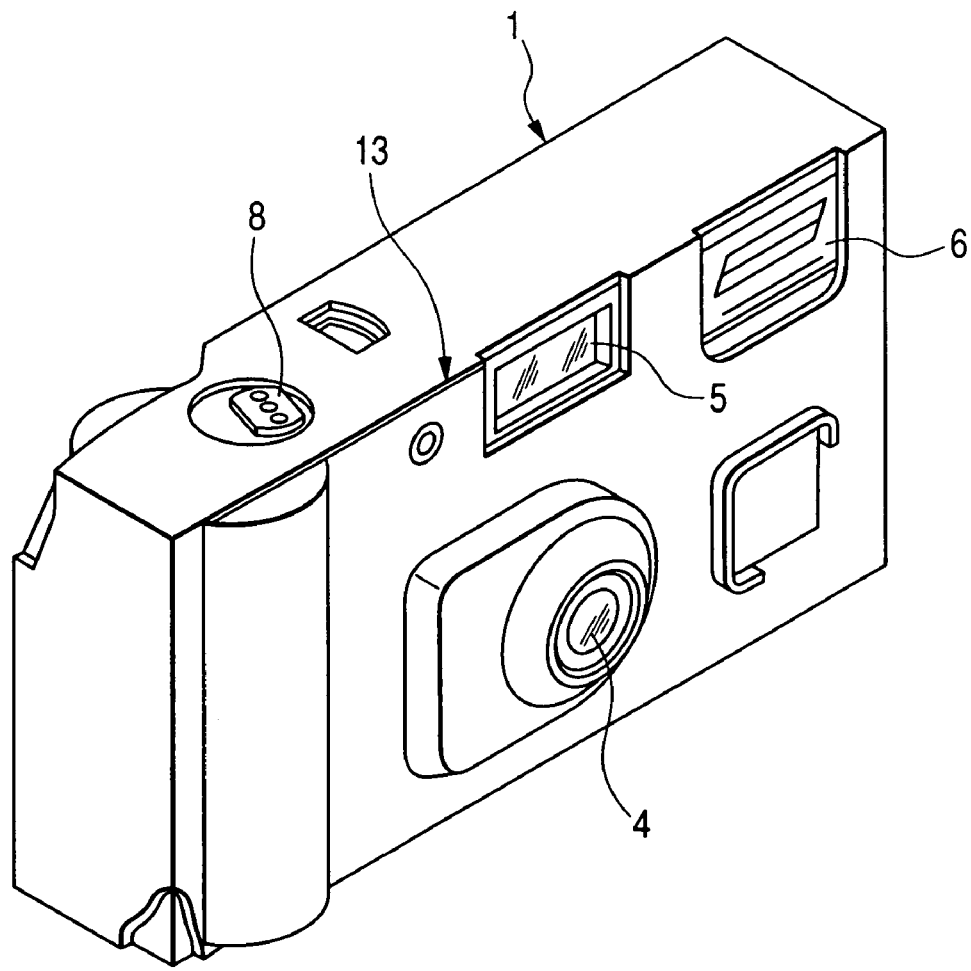
FIG. 3 is an appearance view of one example of a lens-combined film unit that has an optical device of the invention.

The lens-combined film unit of this embodiment comprises (1) a dimmer filter 23 (electrochromic device) and (2) a phototransistor 13 (electromagnetic wave sensor) mounted therein, as in FIG. 2 and FIG. 3. The phototransistor 13 was disposed on the outer part of the unit. Accordingly, an electromotive force could be generated in accordance with the intensity of the external light around the device, and via the dimmer filter 23 as colored by the electromotive force, the quantity of light to reach the color negative film 16 could be controlled.

(1) Electrochromic Device Sample 202:

The electrochromic device sample 202 fabricated in Example 2 was used.

Figure 4:
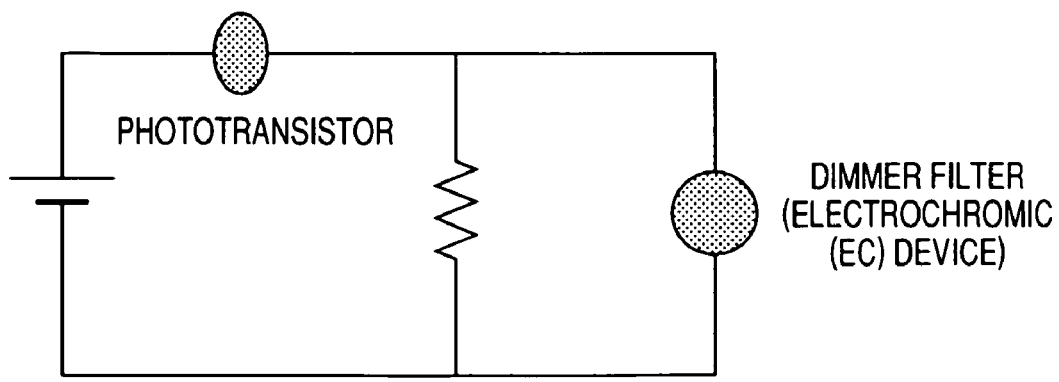
FIG. 4 is a conceptual view showing a circuit example of a control unit that has an optical device of the invention.

(2) Circuit of Electrochromic Device:

A phototransistor (Sharp's PT380) was used as an electromagnetic wave sensor; and as an electromotive force-generating element, used was a dry cell for strobe (AA: 1.5 V) for lens-combined films. Further, a resistor (1 kΩ) was connected in parallel to the electrochromic device 202 (see the outline view of the circuit example of FIG. 4).

Using the above-mentioned (1) dimmer filter and (2) phototransistor, a lens-combined film unit having a constitution shown in Table 5 below was constructed. The ISO sensitivity of the film used was 1600; the lens opening was F8; the shutter speed was 1/85". When an image-taking system constructed under the condition is used and when a picture is taken under a condition of EV=8.4, then a negative image having an optimum density could be obtained.

TABLE 3

| Sample No. | Phototransistor | Electrochromic Device |
|---|---|---|
| 501 (comparative example) | no | no |
| 502 (the invention) | yes | sample 202 |

Figure 5:
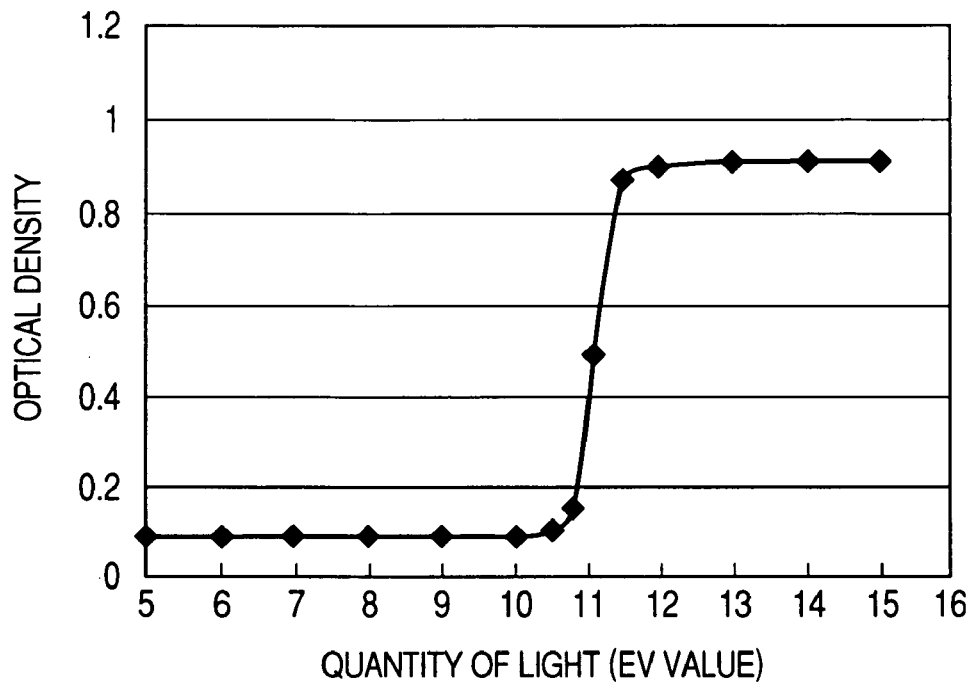
FIG. 5 is a graph showing an electromotive force-responsive characteristic of an optical device of the invention used in Example 3.

A response characteristic of the optical density to the intensity of sunlight of the sample 502 is shown in FIG. 5. The optical density shown herein is a mean value at λ=400 nm to 700 nm. Table 4 shows how the respective optical density data correspond to what degree of "lens opening" (F) generally used in ordinary image-taking systems. The lens opening of "+1" means that the quantity of transmitted light is reduced to a half, and this corresponds to an increase of 0.3 in the optical density. As in FIG. 5, the lens opening of this optical device is +0.2 in a light cut-off state, and when light of EV=11.5 is applied to the device, then it increases up to +2.9, and when light of EV=12.0 or more is applied thereto, then the lens opening increases up to +3.2. The change-responsive time was 10 seconds. EV is a value of indicating lightness, and this is calculated according to the following numerical formula (2) where the lightness in terms of a practical unit lux for brightness is represented by L.

$$EV = \log_2(L/2.4) \quad (2)$$

The optical device is described with reference to the relationship thereof to the above-mentioned lens opening. When the lens opening of an optical device is +1, then this corresponds to a case where the EV value of the brightness of the light taken via the optical device is reduced by 1.

The units 501 (comparative example) and 502 (the invention) were used for picture taking in a light place within a range of EV=6.4 (corresponding to a dark indoor site) to 15.4 (corresponding to a fine weather in midsummer), and the films were processed with Fuji Photo Film CN-16 for 3 minutes and 15 seconds. The exposure level of the negative images obtained as a result in this case is shown in Table 4. The exposure level is for evaluating the suitableness of the processed negative density, and the optimum negative density is 0. Like in the above-mentioned case, the image-taking system tested this time gave a negative image having an optimum density when the picture was taken under the condition of EV=8.4. This means that the exposure level is 0 under this condition. The exposure level of +1 means that the density is higher by a lens opening of 1 than the suitable gray density (in terms of the optical density, this is higher by 0.3); and the exposure level of −1 means that the density is lower by a lens opening of 1 than the suitable gray density (in terms of the optical density, this is lower by 0.3).

TABLE 4

| | Image-Taking Condition | | | | | | | | | |
|---|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 501 (comparative example) | −2.0 | −1.0 | 0 | +1.0 | +2.0 | +3.0 | +4.0 | +5.0 | +6.0 | +7.0 |
| 502 (the invention) | −2.2 | −1.2 | −0.2 | +0.8 | +1.8 | +0.4 | +0.9 | +1.9 | +2.9 | +3.9 |

When a case of printing the negative film obtained herein to give a positive image print is taken into consideration, then it may be possible after exposure level correction in some degree. Concretely, a negative image having an exposure level of from −1 to +4 may be corrected for printing, and "good photographic pictures" may be obtained. If the exposure level is not within the above-mentioned range, then the correction would be unsatisfactory in printing, and the pictures would be "failed" ones. Table 5 shows whether the prints obtained from the negative film that had been photographed under the above-mentioned condition are good or not good (failed).

TABLE 5

| | Image-Taking Condition | | | | | | | | | |
|---|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 501 (comparative example) | failed | good | good | good | good | good | good | failed | failed | failed |
| 502 (the invention) | failed | failed | good | good | good | good | good | good | good | good |

Table 5 means the following: For the sample 502 of the invention having a dimmer system, the practicable range for picture taking has significantly broadened under a condition of high light intensity (under a condition having a large EV value) though it has somewhat narrowed under a condition of low light intensity (under a condition having a small EV value), as compared with that for the comparative sample 501 not having a dimmer system. Accordingly, a camera system generally having a broader practicable range for picture taking has been realized by the invention.

Example 4

This differs from Example 3 where a negative film having an ISO sensitivity of 1600 was set in the lens-combined film, in that the negative film was changed to that having an ISO sensitivity of 100, 400, 1600 and 3200. The result of picture taking with the negative film having each ISO sensitivity is shown in Table 6. Depending on the success degree thereof, the photographed pictures were ranked as A, B, C and D.

TABLE 6

| | | Presence or | Place in Picture Taking | |
|---|---|---|---|---|
| Sample No. | ISO Sensitivity | Absence of Dimmer Filter | dark indoor | light outdoor |
| 601 (comparative example) | 100 | no | D | B |
| 602 (comparative example) | 400 | no | C | B |
| 603 (comparative example) | 1600 | no | B | C |

TABLE 6-continued

| | | Presence or | Place in Picture Taking | |
|---|---|---|---|---|
| Sample No. | ISO Sensitivity | Absence of Dimmer Filter | dark indoor | light outdoor |
| 604 (comparative example) | 3200 | no | A | D |
| 605 (the invention) | 100 | yes | D | B |

TABLE 6-continued

| | | Presence or | Place in Picture Taking | |
|---|---|---|---|---|
| Sample No. | ISO Sensitivity | Absence of Dimmer Filter | dark indoor | light outdoor |
| 606 (the invention) | 400 | yes | C | B |
| 607 (the invention) | 1600 | yes | B | B |
| 608 (the invention) | 3200 | yes | A | B |

Table 6 teaches the following: of the samples 605 to 608 of the invention having a dimmer system, the sample 608 has realized a camera system having a broad practicable range for picture taking. It is understood that the dimmer filter of the invention functions most effectively when combined with a negative film having a high sensitivity.

Example 5

In this Example, an electrochromic device of the invention was mounted on a lens-combined film described in JP-A2003-344914. The samples in this Example were subjected to the same comparative experiment as in Example 3, and also in this Example, the electrochromic device of the invention showed an excellent dimmer effect.

Example 6

Figure 6:
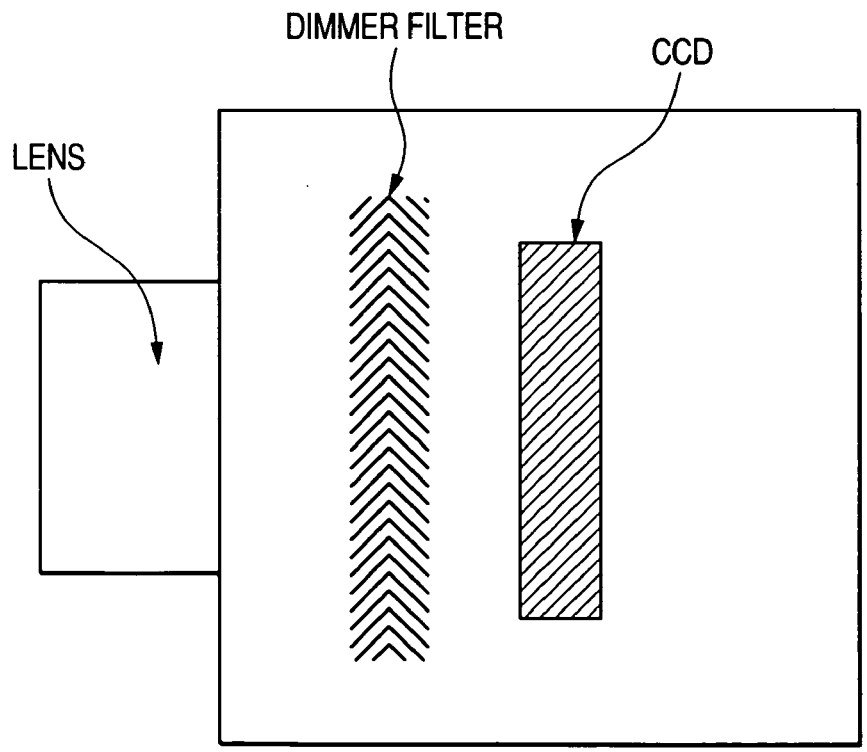
FIG. 6 is a schematic cross-sectional view of an essential part of an electronic still camera that has an optical device of the invention.
Figure 7:
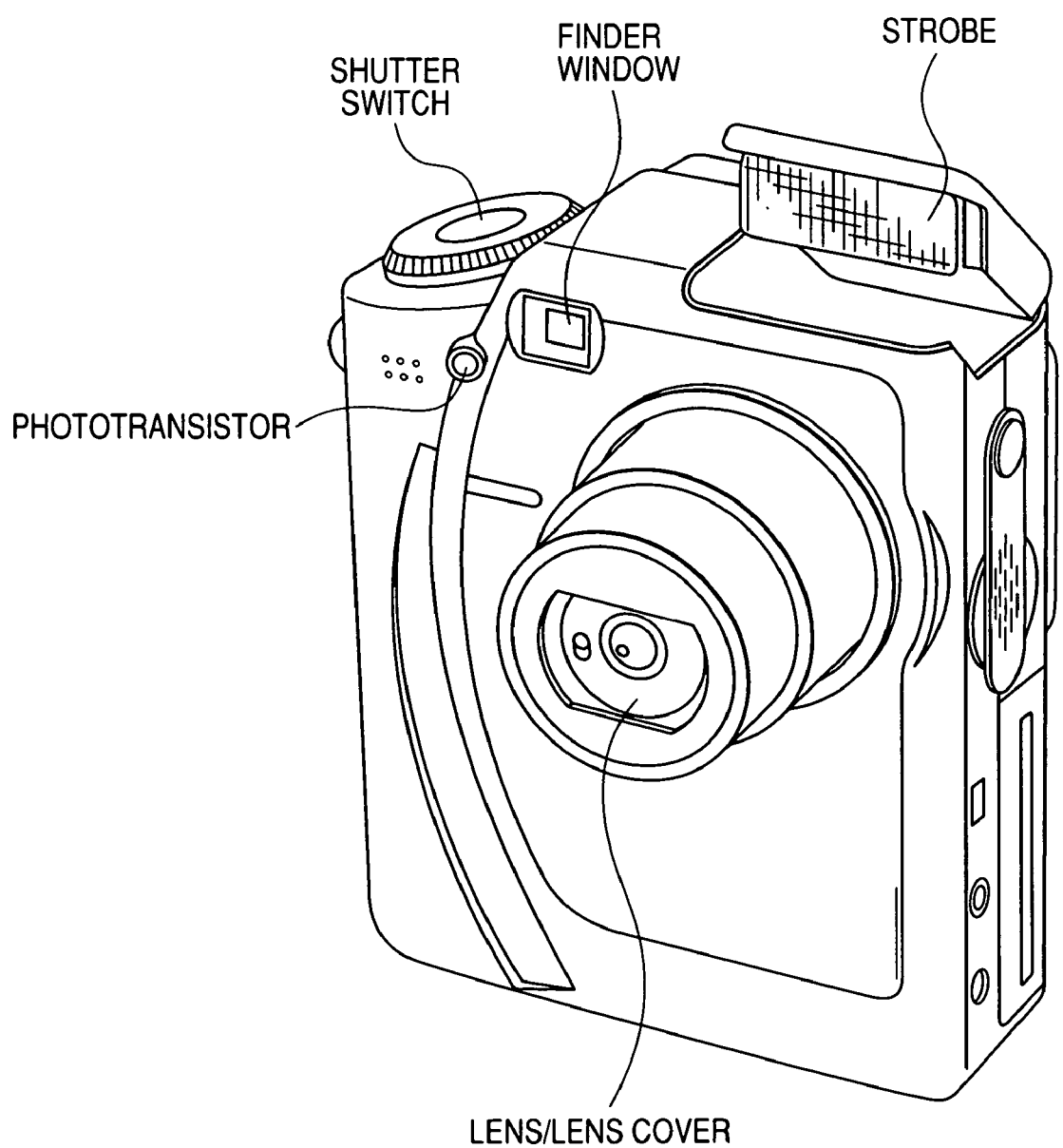
FIG. 7 is a schematic appearance view of one example of an electronic still camera that has an optical device of the invention.

This is to demonstrate an embodiment of fitting a dimmer filter to an electronic still camera. The electronic still camera of the invention comprises the electrochromic device 501 fabricated in Example 3, mounted as a dimmer filler between a lens and CCD therein as in FIG. 6; and, as in FIG. 7, it has a phototransistor fitted to the outer casing thereof like in Example 3. In this, the phototransistor is so connected that the dimmer filter could be controlled by the cell built in the electronic still camera as a power source for it. This was subjected to the same comparative experiment like the lens-combined film unit in Example 3. In the invention, electronic still camera having a narrow dynamic range exhibited a more remarkable dimmer effect than lens-combined film units.

Example 7

This is to demonstrate an embodiment of an electrochromic device of the invention mounted on an electronic still camera described in JP-A 2004-222160. The samples of this Example were subjected to the same comparative experiment as in Example 6, and also in this Example, the electrochromic device of the invention showed an excellent dimmer effect.

Example 8

This is to demonstrate an embodiment of an electrochromic device of the invention mounted on an electronic still camera described in JP-A 2004-236006. The samples of this Example were subjected to the same comparative experiment as in Example 6, and also in this Example, the electrochromic device of the invention showed an excellent dimmer effect.

Example 9

This is to demonstrate an embodiment of an electrochromic device of the invention mounted on an electronic still camera described in JP-A 2004-247842. The samples of this Example were subjected to the same comparative experiment as in Example 6, and also in this Example, the electrochromic device of the invention showed an excellent dimmer effect.

Example 10

This is to demonstrate an embodiment of an electrochromic device of the invention mounted on an electronic still camera described in JP-A 2004-245915. The samples of this Example were subjected to the same comparative experiment as in Example 6, and also in this Example, the electrochromic device of the invention showed an excellent dimmer effect.

Example 11

This is to demonstrate an embodiment of a dimmer filter mounted on an image-taking unit for portable phones. The electrochromic device 401 fabricated in Example 4 was mounted on the lens of an image-taking unit for portable phones, as a dimmer filter in the unit, and like in Example 3, a phototransistor was disposed around the image-taking unit and this was so connected that the dimmer filter could be controlled by the cell built in the mobile phone as a power source for it. The mobile phone with the image-taking unit of this Example mounted therein enabled picture taking under a broader exposure latitude condition, as compared with an image-taking unit not having the optical device of the invention.

Example 12

This is to demonstrate an embodiment of an electrochromic device of the invention mounted on a mobile phone combined with an image-taking lens-having camera fitted thereto described in JP-A 2004-271991. The samples of this Example were subjected to the same comparative experiment as in Example 6, and also in this Example, the electrochromic device of the invention showed an excellent dimmer effect.

The invention has made it possible to control and negatively shift the flat band potential of a semiconductor material independently of the material itself. In a functional device comprising a semiconductor material, the flat band potential control system of the invention has made it possible to select the semiconductor material from the viewpoint of the handlability and the producibility thereof. Further, the invention has made it possible to provide a functional device, especially an electrochromic device having a higher expression effect.

The entire disclosure of each and every foreign patent application from which the benefit of foreign priority has been claimed in the present application is incorporated herein by reference, as if fully set forth.

What is claimed is:

1. A functional device comprising a semiconductor material,
    wherein the functional device contains
    a compound not substantially undergoing oxidation-reduction reaction but having at least one lone electron pair and in which adding the compound negatively changes a flat band potential of the semiconductor material with respect to a case not adding it.
2. The functional device as claimed in claim 1,
    wherein the compound is a heterocyclic compound.
3. The functional device as claimed in claim 1,
    wherein an atom having the lone electron pair is an N atom or an O atom.
4. The functional device as claimed in claim 1,
    wherein the compound having the lone electron pair is an N or O atom-containing, 5- or 6-membered ring compound.
5. The functional device as claimed in claim 1,
    wherein a charge on an atom having the lone electron pair is −0.40 or less.
6. The functional device as claimed in claim 1,
    wherein an energy level of an atom having the lone electron pair is −11 eV or more.
7. The functional device as claimed in claim 1,
    wherein a charge on an atom having the lone electron pair is −0.50 or less, and
    an energy level of the atom having the lone electron pair is −9.5 eV or more.
8. An electrochromic device which is the functional device as claimed in claim 1, comprising:
    a cathode;
    an anode; and
    a charge-transporting material sandwiched between the cathode and the anode,
    wherein the charge-transporting material contains the compound.
9. The electrochromic device as claimed in claim 8, having an optical density of 0.2 or less at a wavelength of 400 nm in a decolored state.
10. The electrochromic device as claimed in claim 8,
    wherein a mean value of an optical density at a wavelength of from 400 to 500 nm, a mean value of an optical density at a wavelength of from 500 to 600 nm, and an mean value of an optical density at a wavelength of from 600 to 700 nm in a decolored state are all 0.1 or less.

11. An optical device comprising:

an electromotive force-generating element capable of generating an electromotive force in response to electromagnetic waves; and the electrochromic device as claimed in claim 8 capable of being driven by the electromotive force.

12. An image-taking unit comprising the optical device as claimed in claim 11.

13. The image-taking unit as claimed in claim 12, which is a lens-combined film.

* * * * *